(12) United States Patent
Ito

(10) Patent No.: US 7,444,650 B2
(45) Date of Patent: Oct. 28, 2008

(54) DISK APPARATUS

(75) Inventor: Shigehiro Ito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 509 days.

(21) Appl. No.: 11/073,545

(22) Filed: Mar. 8, 2005

(65) Prior Publication Data
US 2005/0235296 A1 Oct. 20, 2005

(30) Foreign Application Priority Data
Apr. 16, 2004 (JP) ............................... 2004-121912

(51) Int. Cl.
*G11B 17/03* (2006.01)
(52) U.S. Cl. ........................ 720/619; 720/604; 720/615; 720/622; 720/623; 720/699
(58) Field of Classification Search ............... 369/30.52, 369/30.58, 30.77, 30.78, 30.81, 30.85, 30.89; 720/604, 615, 619, 622, 623, 699
See application file for complete search history.

(56) References Cited

U.S. PATENT DOCUMENTS 5,982,720 A * 11/1999 Takemasa et al. ......... 369/30.78
6,392,981 B2 * 5/2002 Watanabe et al. ........... 720/615
6,832,382 B2 * 12/2004 Ito et al. ..................... 720/619
2003/0112718 A1 * 6/2003 Otsuki ..................... 369/30.85

FOREIGN PATENT DOCUMENTS

| DE | 3645203 C2 | 10/1986 |
| DE | 19913892 A1 | 10/1999 |
| JP | 10-293954 A | 11/1998 |
| JP | 2002-197774 A | 7/2002 |
| JP | 2005-259270 A | 9/2005 |

* cited by examiner

*Primary Examiner*—William J. Klimowicz
*Assistant Examiner*—Carlos E Garcia
(74) *Attorney, Agent, or Firm*—Birch, Stewart, Kolasch & Birch, LLP

(57) ABSTRACT

A disk apparatus includes a playback unit having a reading unit for reading information recorded on a disk, and a turntable on which the disk is placed, the playback unit being movable between a lateral side of a disk conveying path and a central portion of the disk, an arc-shaped stocker for stocking the disk, the stocker being shaped like a part of a circle whose more than half of its area including a center is removed in order to make it possible for the playback unit to move toward the central portion of the disk, and a supporting member disposed separately from the stocker opposite to a part of the disk which is not held by the stocker, the supporting member restricting horizontal movements of the disk.

2 Claims, 35 Drawing Sheets

DISK APPARATUS

BACKGROUND OF THE INVENTION

1. Field of the Invention

The present invention relates to a disk apparatus that plays back information stored in a disk. More particularly, it relates to a disk apparatus that can be used with being mounted in a moving object, such as a motor vehicle.

2. Description of Related Art

A related art disk apparatus is provided with a playback unit that can move between a lateral side of a disk conveyance path and a central portion of a disk stored therein, and a plurality of stockers each for stocking an inserted disk, each stocker being shaped like a part of a circle whose more than half of its area including a center is removed in order to make it possible for the playback unit to move toward the central portion of a disk stored in each stocker, supports a part of the perimeter of a disk which is in the removed part of each stocker by using a supporting member disposed on each stocker and brought into contact with the part of the perimeter of the disk, and rotates and retracts the supporting member toward a position where it does not act on the disk when there is no necessity to support the disk (refer to patent reference 1, for example).

[Patent reference 1] JP, 2002-197774,A (see paragraphs 0011, 0073, 0074, 0076, and 0077 and FIG. 2)

A problem with the related art disk apparatus is that since it supports a part of the perimeter of a disk which is in the removed part of each stocker by using the supporting member disposed on each stocker and brought into contact with the part of the perimeter of the disk so as to prevent a displacement of the disk in a horizontal direction, the component count increases.

As previously mentioned, since the related art disk apparatus supports a part of the perimeter of a disk which is in the removed part of each stocker by using the supporting member disposed on each stocker and brought into contact with the part of the perimeter of the disk, and rotates and retracts the supporting member toward a position where it does not act on the disk when there is no necessity to support the disk, the related art disk apparatus can prevent any displacement of the disk stored in each stocker in a horizontal direction. However, since the load of the disk stored in each stocker is held only by each stocker, there is a possibility that the disk stored in each stocker may be inclined downward toward the removed part of each stocker and the disk may drop into the disk apparatus and it is impossible to prevent the possibility of the drop of the disk. Furthermore, when a level at which the playback unit is horizontally moved and a level at which each stocker stores a disk therein are made to be close to each other in order to miniaturize and slim down the disk apparatus, if the disk stored in each stocker is inclined, the playback unit is brought into contact with the edge of the disk and cannot be made to rotate toward the central portion of the disk.

SUMMARY OF THE INVENTION

The present invention is made in order to solve the above-mentioned problems, and it is therefore an object of the present invention to provide a small, slim, and high-reliability disk apparatus having a small component count, which prevents downward inclination of a disk stored in each stocker so as to prevent drop of the disk and which restricts a vertical position of the disk stored in each stocker.

In accordance with an aspect of the present invention, there is provided a disk apparatus including: a playback unit having a reading unit for reading information recorded on a disk, and a turntable on which the disk is placed, the playback unit being movable between a lateral side of a disk conveyance path and a central portion of the disk; an arc-shaped stocker for stocking the disk, the stocker being shaped like a part of a circle whose more than half of its area including a center is removed in order to make it possible for the playback unit to move toward the central portion of the disk; and a supporting member disposed separately from the stocker opposite to a part of the disk which is not held by the stocker, the supporting member restricting horizontal movements of the disk. Therefore, the component count can be reduced.

In accordance with another aspect of the present invention, there is provided a disk apparatus including: a playback unit having a reading unit for reading information recorded on a disk, and a turntable on which the disk is placed, the playback unit being movable between a lateral side of a disk conveyance path and a central portion of the disk; an arc-shaped stocker for stocking the disk, the stocker being shaped like a part of a circle whose more than half of its area including a center is removed in order to make it possible for the playback unit to move toward the central portion of the disk; and a rotatable supporting member having a sandwiching portion that sandwiches a part of the disk which is not held by the stocker, the supporting member restricting a vertical position of the disk. Therefore, the disk apparatus can certainly prevent the disk from inclining downward toward the removed part of the stocker.

As a result, while the manufacturing cost of the disk apparatus can be reduced, the disk apparatus can certainly hold disks stocked therein with them being placed in horizontal positions. In addition, even if the elevation position at which the playback unit is moved horizontally is made to be close to the elevation position at where a disk is stocked into the stocker in order to slim down the disk apparatus, there is no interference with horizontal movements of the playback unit.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
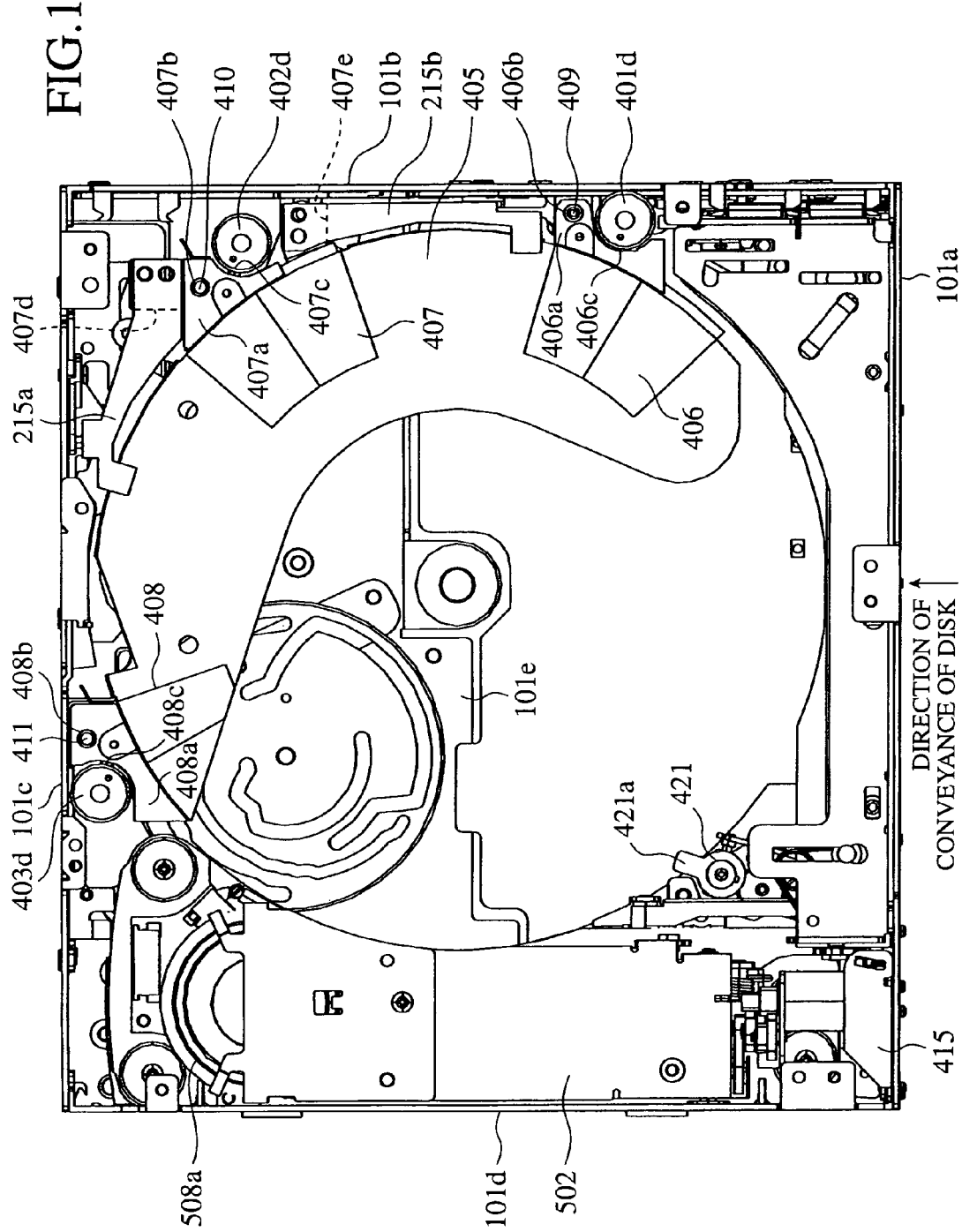
FIG. 1 is a plan view showing the internal structure of a disk apparatus in accordance with the present invention.
Figure 2:
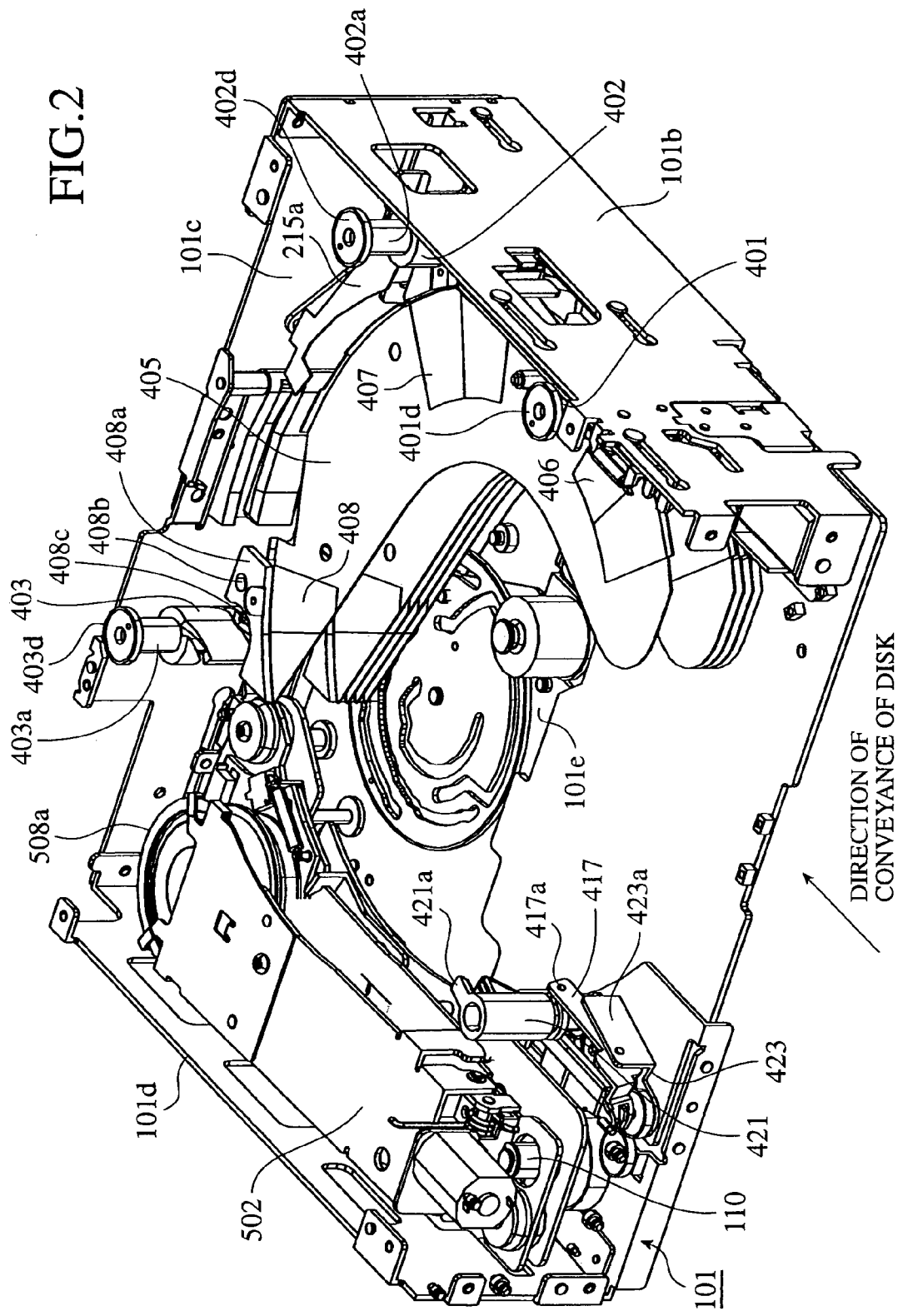
FIG. 2 is a perspective diagram showing the internal structure of the disk apparatus, but in which a top plate and a front side plate of a housing are removed.
Figure 3:
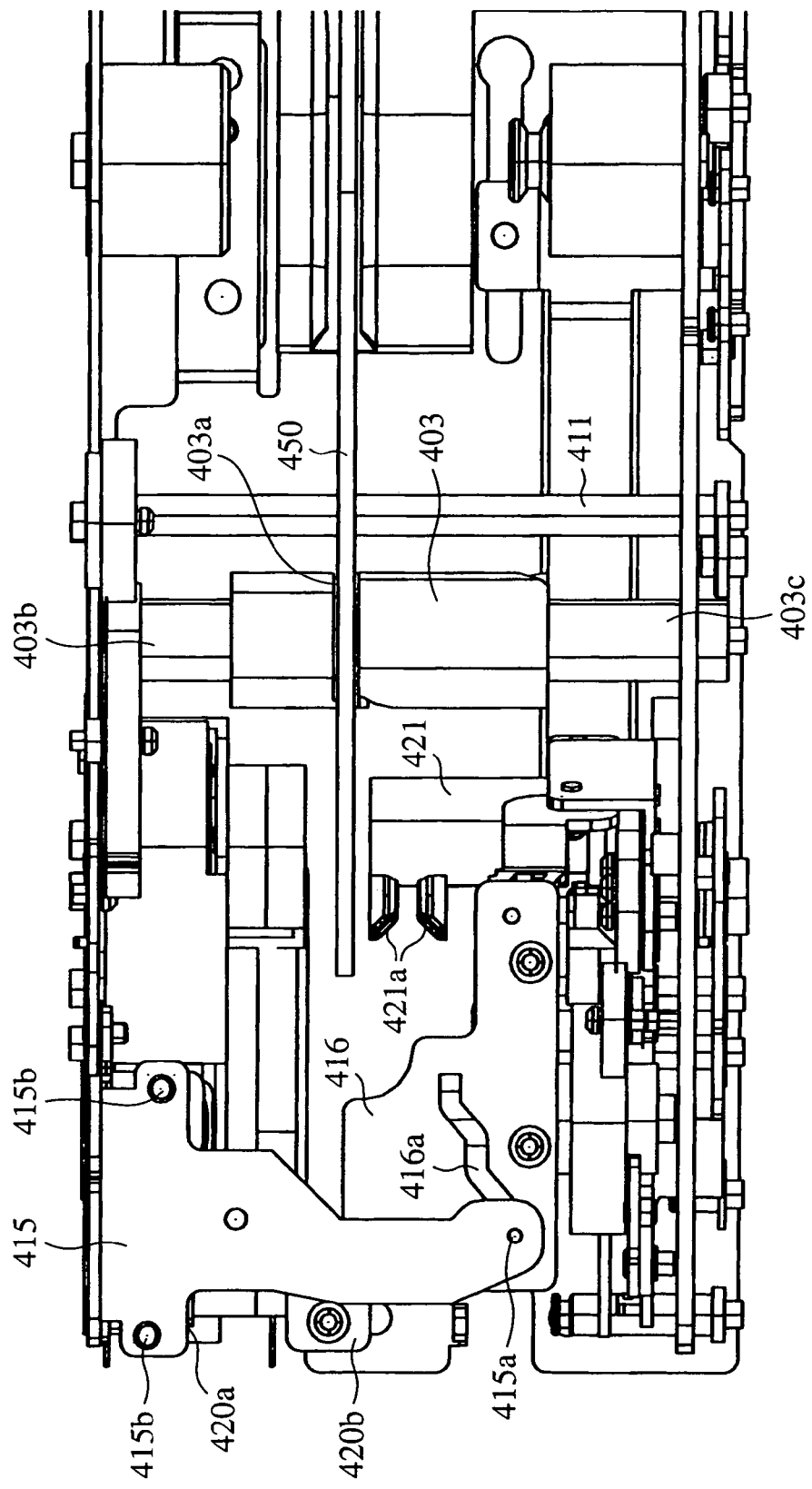
FIG. 3 is a front view showing a left half of a main part of the disk apparatus, but showing a state in which a disk is inserted into the disk apparatus.
Figure 4:
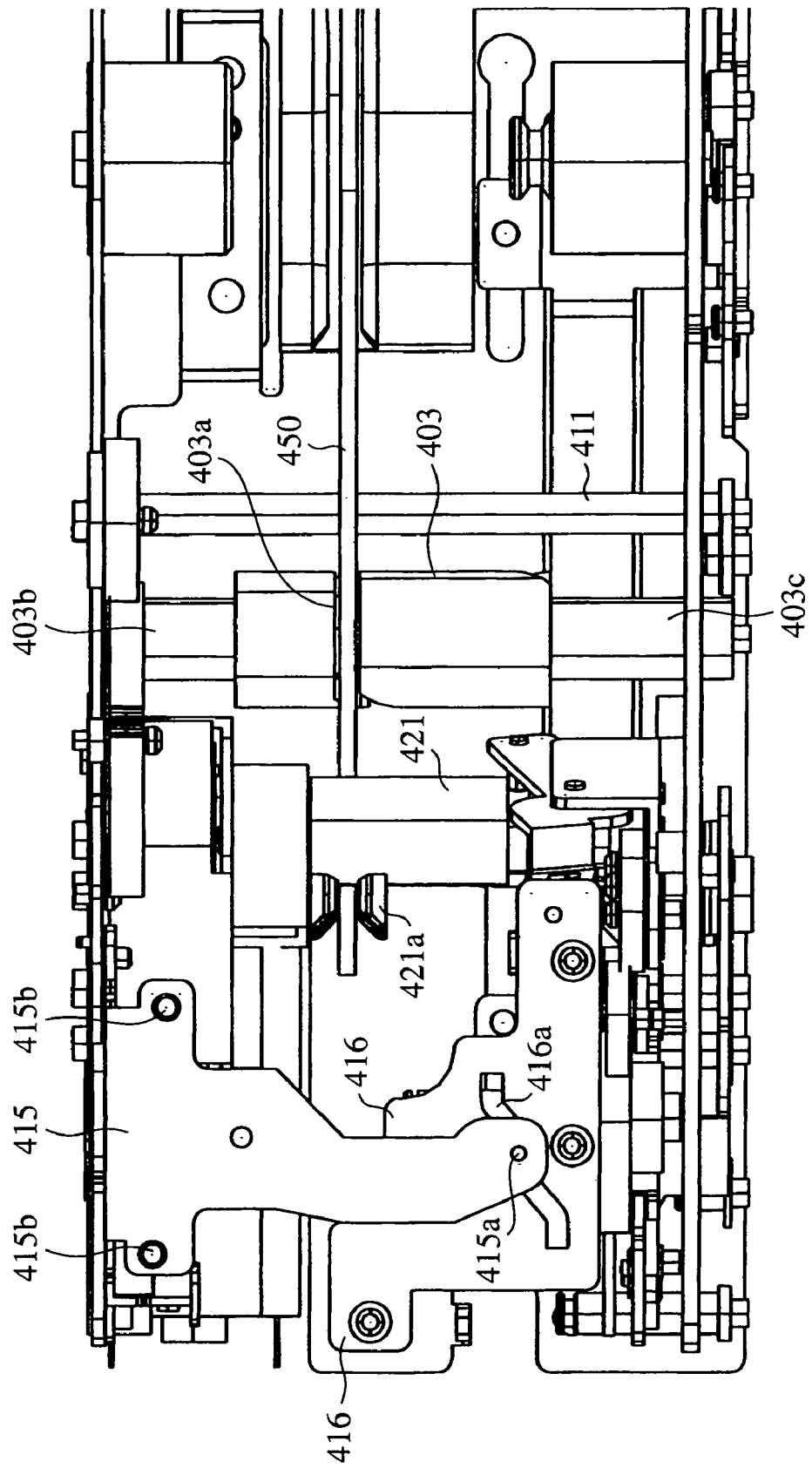
FIG. 4 is a front view of the left half of the main part of the disk apparatus, but showing a state in which a disk guide member is moved upward.
Figure 5:
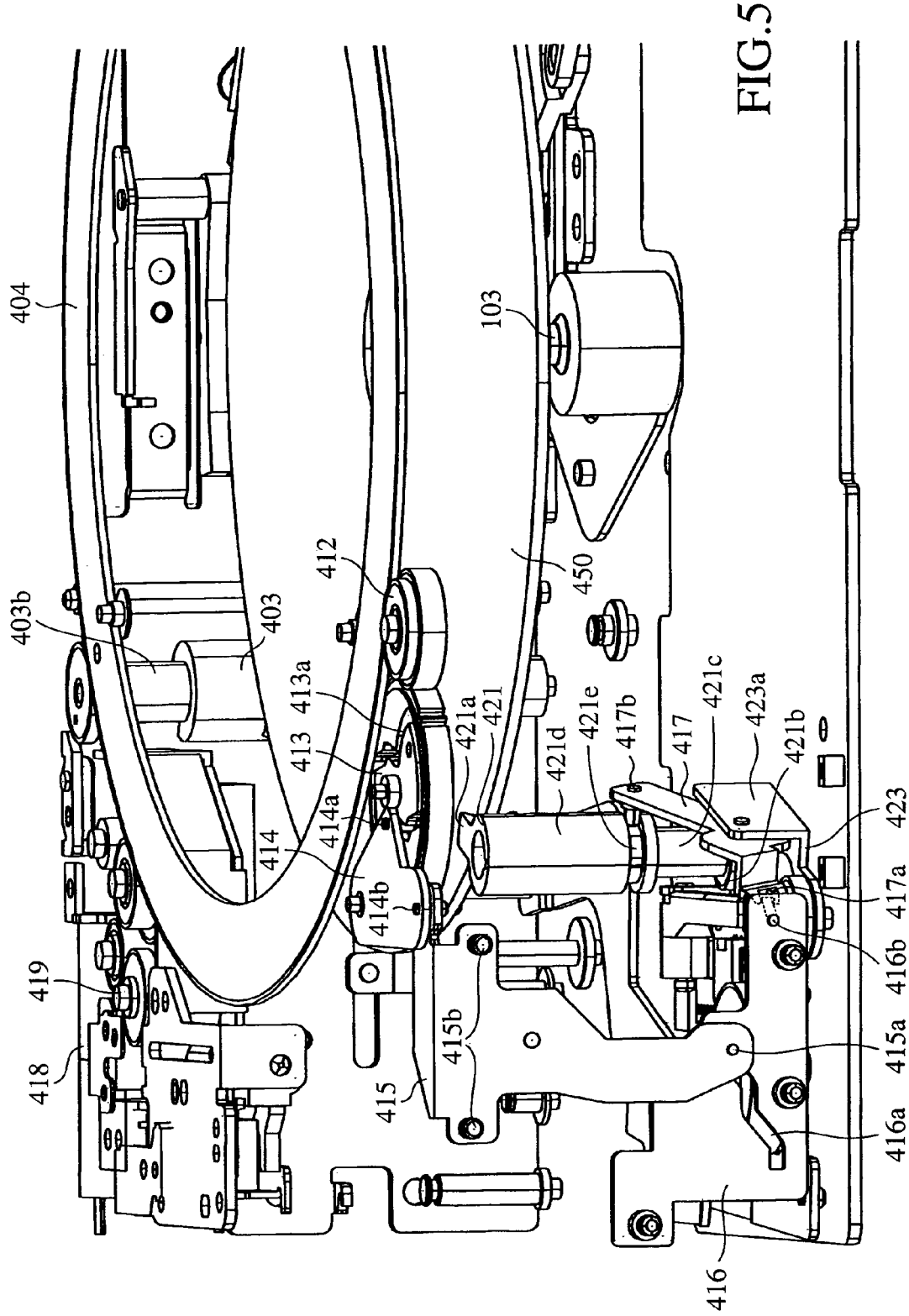
FIG. 5 is a perspective diagram of the disk apparatus, but showing a state in which the disk is raised to a playback unit entry position in the state of FIG. 4.
Figure 6:
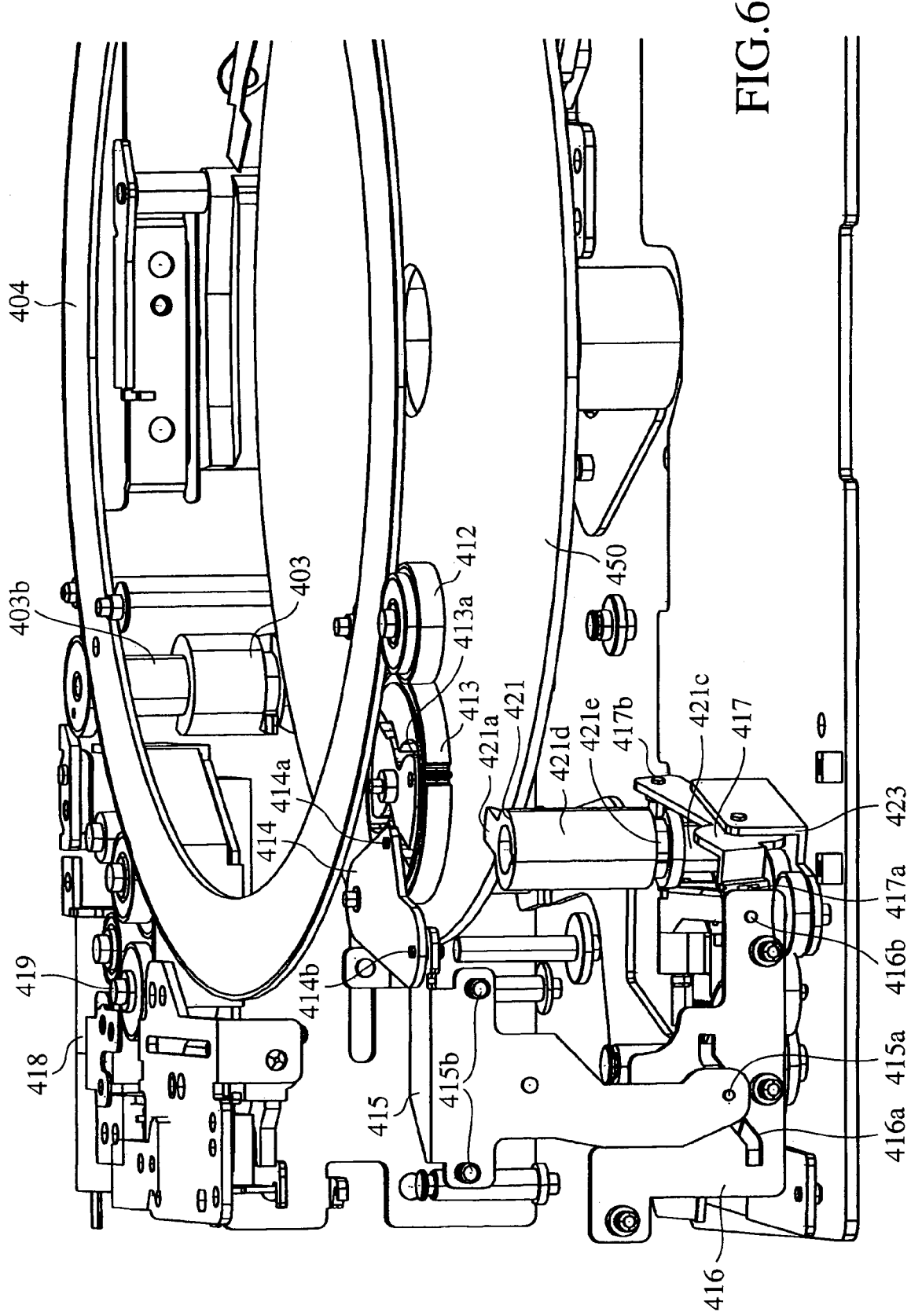
FIG. 6 is a perspective diagram of the disk apparatus, but showing a state in which the disk is clamped and held on a turntable.

FIG. 1 is a plan view showing the internal structure of a disk apparatus in accordance with the present invention, FIG. 2 is a perspective diagram showing the internal structure of the disk apparatus, but in which a top plate and a front side plate of a housing are removed, FIG. 3 is a front view showing a left half of a main part of the disk apparatus, but showing a state in which a disk is inserted into the disk apparatus, FIG. 4 is a front view of the left half of the main part of the disk apparatus, but showing a state in which a disk guide member is moved upward, FIG. 5 is a perspective diagram of the disk apparatus, but showing a state in which the disk is raised to a playback unit entry position in the state of FIG. 4, and FIG. 6 is a perspective diagram of the disk apparatus, but showing a state in which the disk is clamped and held on a turntable.

As shown in those figures, a drive mechanism, a disk insertion/ejection mechanism, a disk changer mechanism, a playback unit, a number of cams, levers, etc. for making them work in cooperation with one another are disposed in the interior of the housing 101. The drive mechanism is provided with a motor disposed, as a driving source, at aback-side corner of the bottom plate 101e of the housing 101, and cam members, levers, etc. which are disposed on the rear plate 101c, right-hand and left-hand side plates 101b and 101d, and bottom plate 101 of the housing 101 so that they are related to one another. The disk insertion/ejection mechanism, which will be mentioned below in detail, is disposed on a side of the front side plate of the housing 101.

In the disk changer mechanism, three disk upward/downward moving members (referred to as rotation axes from here on) 401, 402, and 403 are supported at positions having angles of about 0 degrees, 90 degrees, and 180 degrees with respect to a diagonal line connecting between a right end of the front side plate and a left end of the rear plate, and between the bottom plate 101d and top plate (not shown) of the housing, as shown in FIG. 2. Small-diameter portions 401b, 402b, and 403b having a height enough to accommodate a predetermined number of disks 450 (for example, five disks) are formed in upper parts of the rotation axes 401, 402, and 403, respectively, and small-diameter portions 401c, 402c, and 403c are also formed in lower parts of the rotation axes, respectively. Step-wise spiral grooves 401a, 402a, and 403a are formed in the outer surfaces of large-diameter middle portions of the rotation axes, respectively.

Each stocker 405 that supports a disk 450 is comprised of an arc-shaped sheet material, which is shaped like a part of a circle whose more than half of its area including a center is removed. Each stocker 405 has supporting members 406, 407, and 408 which are attached to parts thereof having angles of about 0 degrees, 90 degrees, and 180 degrees with respect to the diagonal line connecting between the right end of the front side plate and the left end of the rear plate, respectively. As shown in FIG. 1, projecting portions 406a, 407a, and 408a which are projecting outwardly from the supporting members 406, 407, and 408, respectively, have holes 406b, 407b, and 408b through which guide pins 409, 410, and 411 installed in the vicinity of the rotation axes 401, 402, and 403 are passed, and pins 406c, 407c, and 408c which are engaged with the spiral grooves 401a, 402a, and 403a formed in the rotation axes 401, 402, and 403, respectively. Furthermore, attachment arms 407d and 407e to which stocker flat springs 215a and 215b are attached are disposed on the projecting member 407a.

By virtue of this structure, the large-diameter gear 404 rotates according to the driving force of the motor 418 by way of the gear series 419, and therefore the rotation axes 401, 402, and 403, which are engaged with the large-diameter gear 404, simultaneously rotate by way of the gears 401d, 402d, and 403d, respectively. As a result, each stocker 405 can be made to move upward or downward along the spiral grooves 401a, 402a, and 403a.

As shown in FIG. 5, the disk changer mechanism is further provided with a gear 412 which is disposed in the vicinity of the disk insertion/ejection opening 303 (see FIG. 7) and is engaged with the large-diameter gear 404, a gear 413 which is engaged with the gear 412, a shaking lever 414 having a pin 414a which is engaged with an 8-shaped cam groove 413a formed in the gear 413, a sliding plate 415 which is connected with the shaking lever 414 via a pin 414b of the shaking lever 414, and which slides rightward or leftward along the front side plate 101a of the housing, a sliding plate 416 having a cam groove 416a engaged with a pin 415a of the sliding plate 415, the sliding plate 416 sliding upward or downward along the front side plate 101a of the housing, and a rotary plate 417 having a forked portion 417a at an end thereof, which is engaged with a pin 416b of the sliding plate 416.

As shown in FIG. 5, the rotary plate 417 is supported by a vertically bent portion 423a of a rotary member 423 which is supported on the bottom plate 101e of the housing so that the rotary member 423 can horizontally rotate, an axial member 421c is rotatably supported by the rotary member 423, and a gear 421b is disposed at a lower end of the axial member 421c. Furthermore, an external cylinder 421d is slipped over the axial member 421c, a circumferential groove 421e which is engaged with a pin 417b disposed at a free end of the rotary member 417 is formed in a lower part of the external cylinder 421d, and a sandwiching portion 421a for sandwiching the disk 450 is disposed at an upper end of the external cylinder 421d. These components constitute a disk guide member 421 as a disk supporting mechanism.

The gears 412 and 413 and the shaking lever 414 are supported by the top plate of the housing, and pins 415b formed in left-hand and right-hand end portions of the sliding plate 415 are engaged with horizontal long holes 420a (see FIG. 7) of the front side plate 101a of the housing, respectively. Furthermore, a pin 416a disposed on the sliding plate 416 is engaged with a perpendicular long hole 420b formed in the front side plate 101a of the housing.

As shown in FIG. 2, the playback unit is provided with a playback member 502 that is rotatably supported by an axis 110 which is vertically disposed on the bottom plate 101e of the housing 101. When not playing back any disk, the playback member 502 is retracted along a disk conveyance path toward a lateral side of the housing. On the other hand, when playing back a disk, the playback member 502 is rotated and moved from the lateral side of the housing to a playback position at the center of the housing (i.e., a central portion of the disk).

Next, the operation of the disk apparatus in accordance with this embodiment of the present invention will be explained. When inserting a disk 450 into the disk apparatus or ejecting a disk 450 from the disk apparatus, the disk guide member 421 has been retracted toward a lower area which is apart from the disk conveyance path, as shown in FIG. 3. When a disk 450 is inserted in this state, the disk 450 is passed over the disk guide member 421. When a sensor not shown then detects the insertion of the disk to a predetermined position and generates a detection signal, the motor 418 is started according to this detection signal, and the driving force of the started motor 418 is transmitted to the large-diameter gear 404 via the gear series 419 and the rotation axes 401, 402, and 403 are rotated via the gears 401d, 402d, and 403d, respectively.

At this time, the disk guide member 421 simultaneously ascends up to the disk conveyance path, as shown in FIG. 4, by way of the gear 412 engaged with the large-diameter gear 404, the gear 413 engaged with the gear 412, the shaking lever 414 having the pin 414a engaged with the 8-character type cam groove 413a formed in the gear 413, the sliding plate 415 which is connected with the shaking lever 414 via the pin 414b, and which slides rightward or leftward along with the front side plate 101a of the housing, the sliding plate 416 having the cam groove 416a engaged with the pin 415a of the sliding plate 415, the sliding plate 416 sliding upward or downward along the front side plate 101a of the housing, and the rotary plate having the forked portion 417a engaged with the pin 416b of the sliding plate 416 at an end thereof.

In this state, the rotary force is transmitted to gear 421b via a gear series not shown, and the disk guide member 421 rotates and then holds the disk by using the sandwiching portion 421a thereof. In this state in which the disk is held by the disk guide member, the disk 450 is made to ascend up to an entry position, as shown in FIG. 5, at which the disk can be made to enter the playback member 502.

Further rotation of the large-diameter gear 404 causes the disk guide member 421 to descend to a position shown in FIG. 6, and the disk 450 is then placed on the turntable of the playback member 502 which has moved from its retraction position to the playback position in synchronization with the above-mentioned movement. In this state, damper 508a clamps the disk 450 onto the turntable, and the playback unit plays back the disk 450.

As mentioned above, since the disk apparatus in accordance with this embodiment 1 includes the disk guide member having the sandwiching portion that sandwiches a part of a disk which is not held by a stocker with the disk guide member restricting the vertical position of the disk, the disk apparatus can certainly prevent the disk from inclining downward toward the removed part of the stocker. As a result, the disk apparatus can certainly hold disks stocked therein with them being placed in horizontal positions. In addition, even if the elevation position at which the playback unit is moved horizontally is made to be close to the elevation position at where a disk is stocked into each stocker in order to slim down the disk apparatus, there is no interference with horizontal movements of the playback unit. In addition, since the disk guide member is retracted to below the disk conveyance path while a disk is conveyed, there is no interference with the conveyance of the disk even if the disk guide member is placed in a disk conveyance area in which the disk is conveyed, and the structure of this embodiment is effective in the downsizing of the disk apparatus as compared with a case where the disk guide member is placed outside the disk conveyance area.

Figure 7:
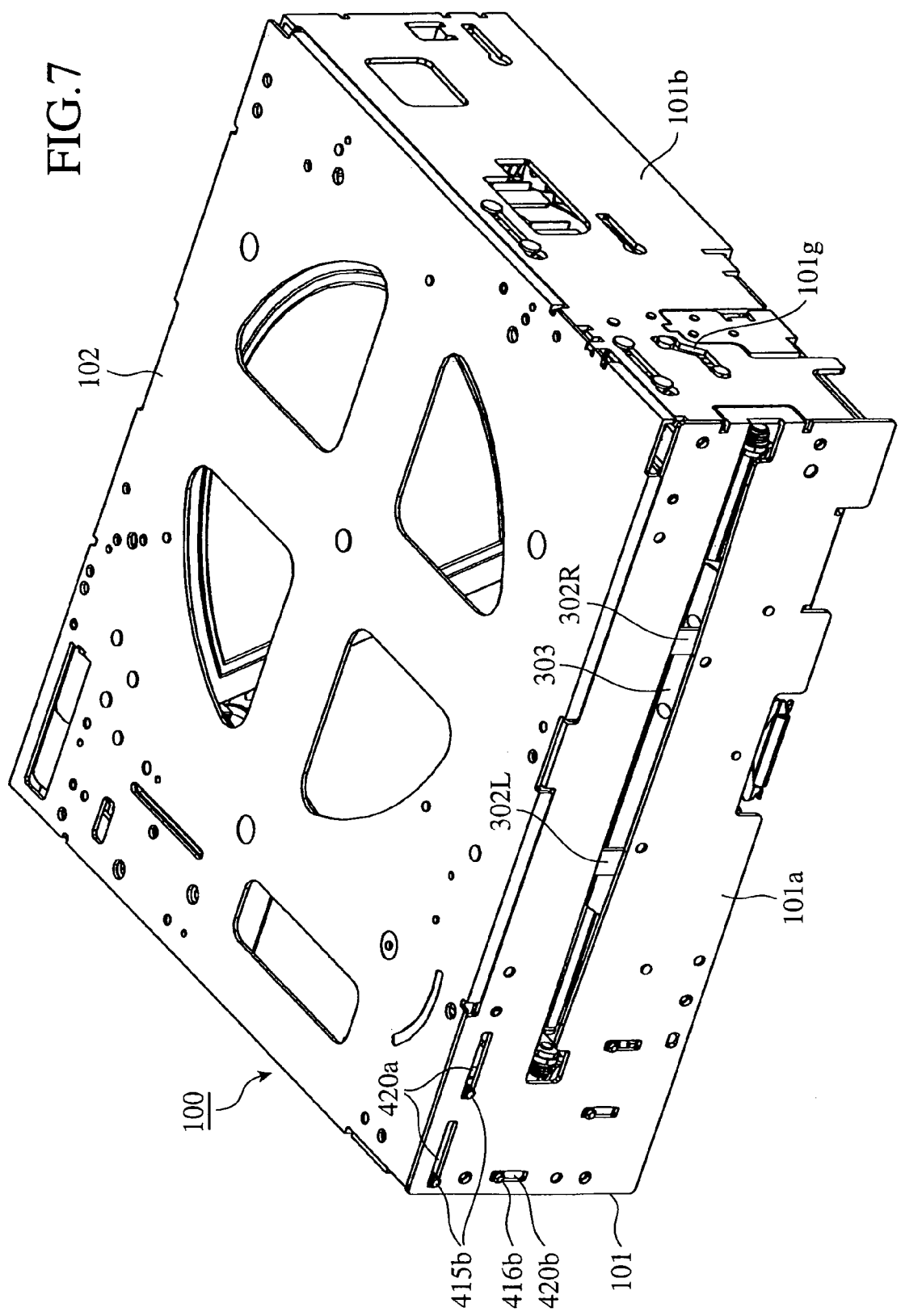
FIG. 7 is a perspective diagram showing the outward appearance of a main part of the disk apparatus.
Figure 8:
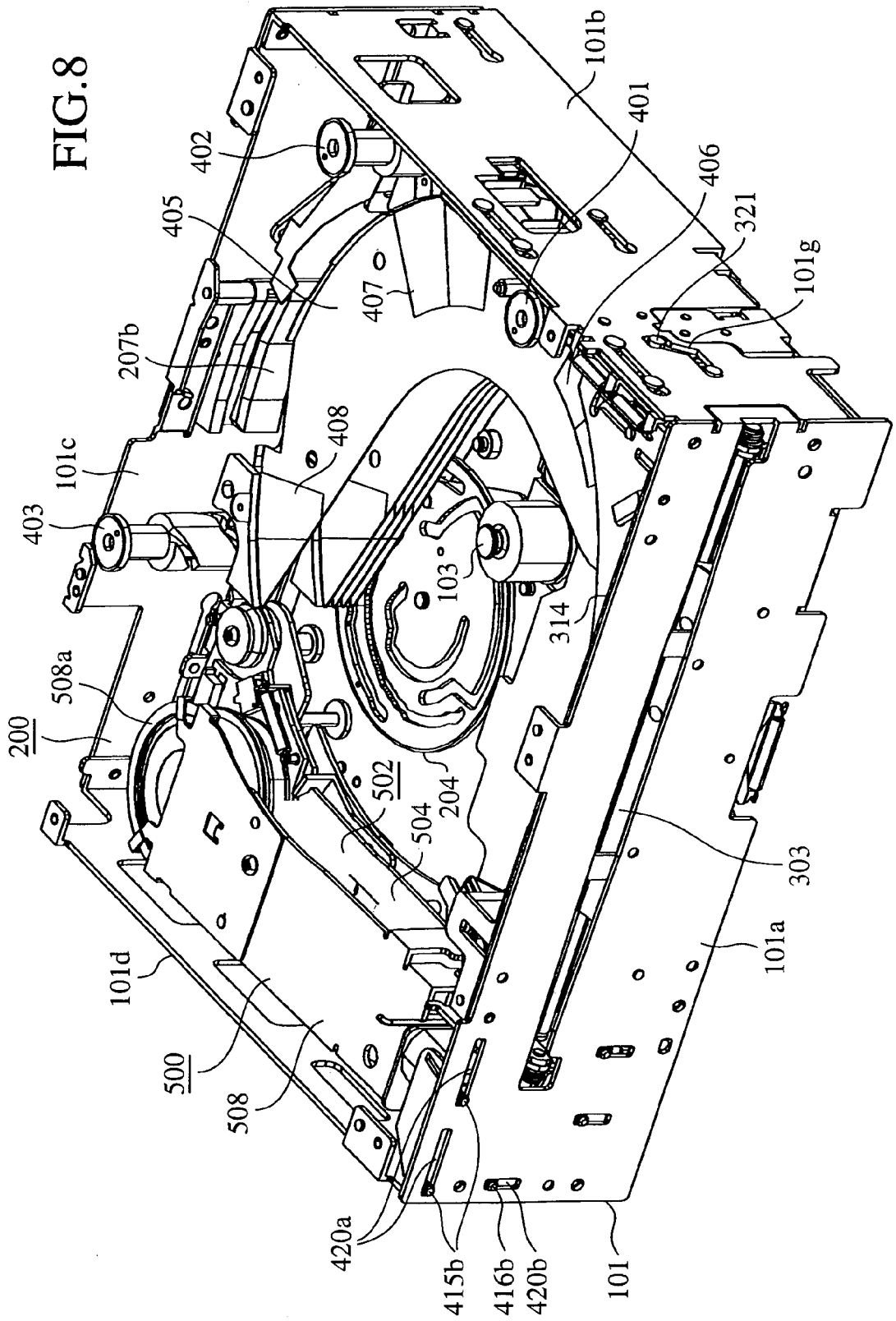
FIG. 8 is a perspective diagram showing the interior of the disk apparatus, but in which a top plate is removed from a housing of the disk apparatus.
Figure 9:
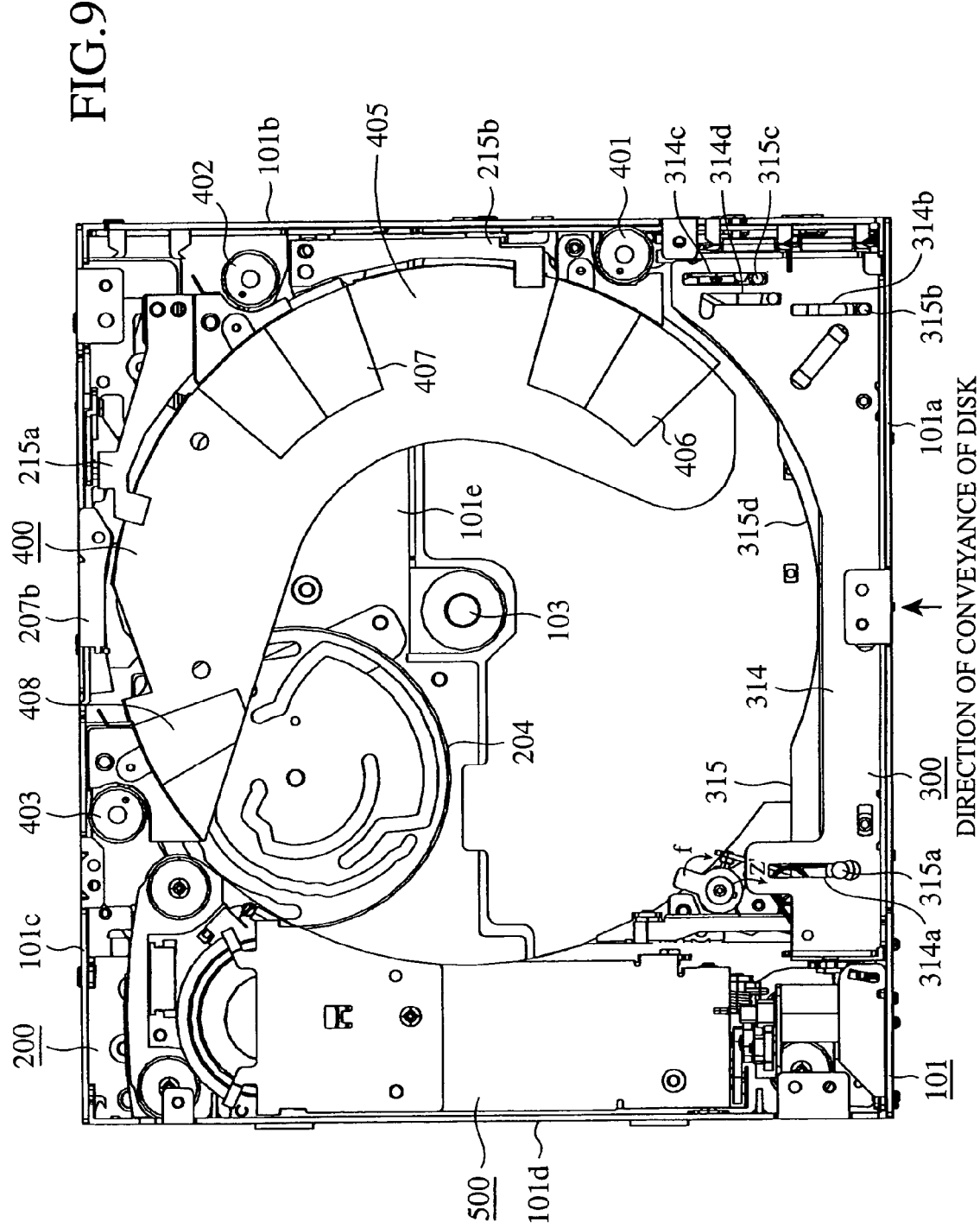
FIG. 9 is a plan view of FIG. 8.
Figure 10:
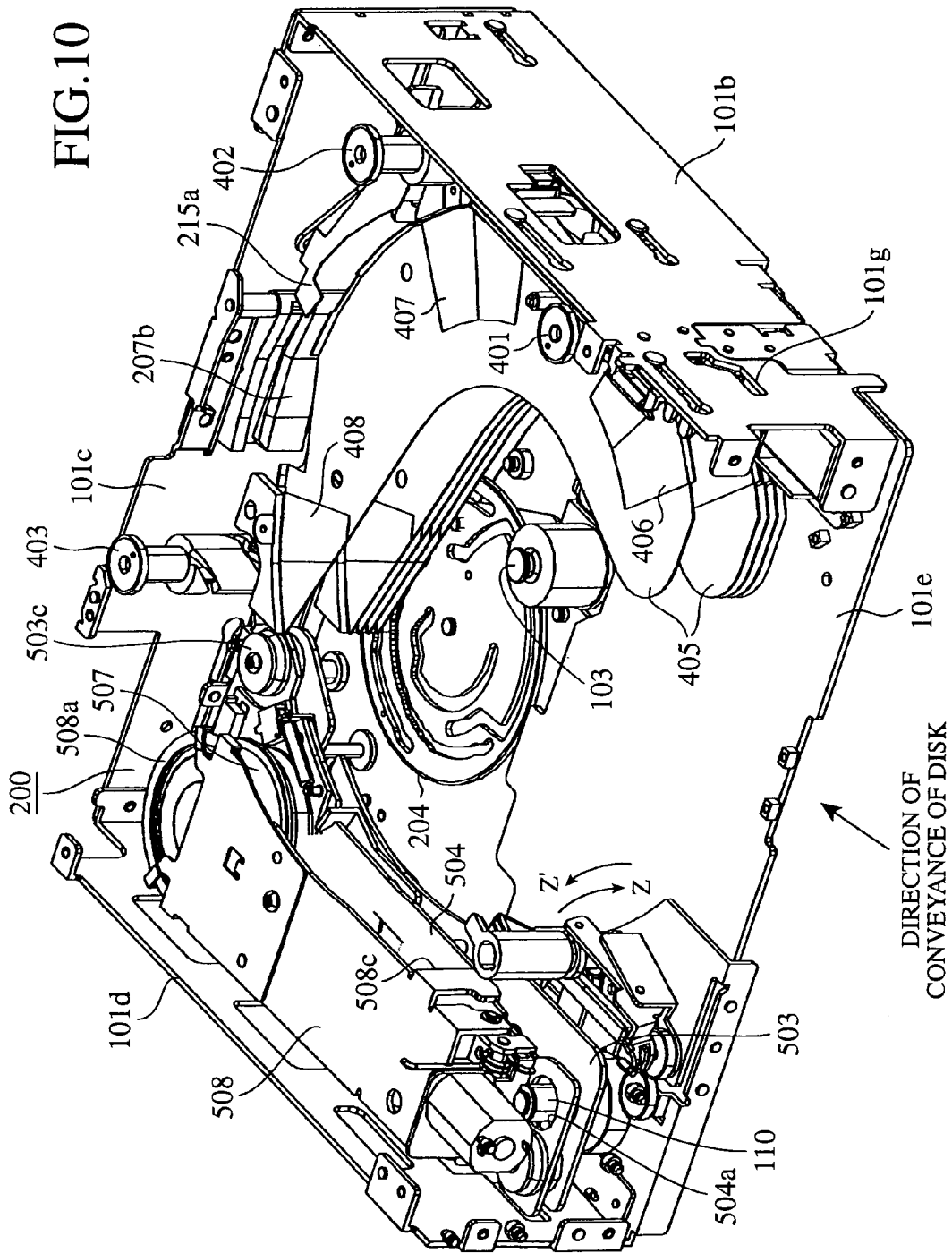
FIG. 10 is a perspective diagram showing the disk apparatus, but in which a front side plate of the housing is removed.

Hereafter, an example of the disk apparatus in accordance with the present invention will be explained with reference to drawings. FIG. 7 is a perspective diagram showing the outward appearance of a main part 100 of the disk apparatus, FIG. 8 is a perspective diagram showing the interior of the main part, but in which a top plate 102 is removed from the housing 101, FIG. 9 is a plan view of FIG. 8, and FIG. 10 is a perspective diagram of the disk apparatus, but showing a state in which the front side plate 101a of the housing 101 is removed.

As shown in these figures, the drive mechanism 200, the disk insertion/ejection mechanism 300, the disk changer mechanism 400, the playback unit 500, a number of cams, levers, etc. for making them work in cooperation with one another are disposed in the interior of the housing 101. Hereafter, those components will be explained with reference to FIGS. 1 to 35.

Figure 12:
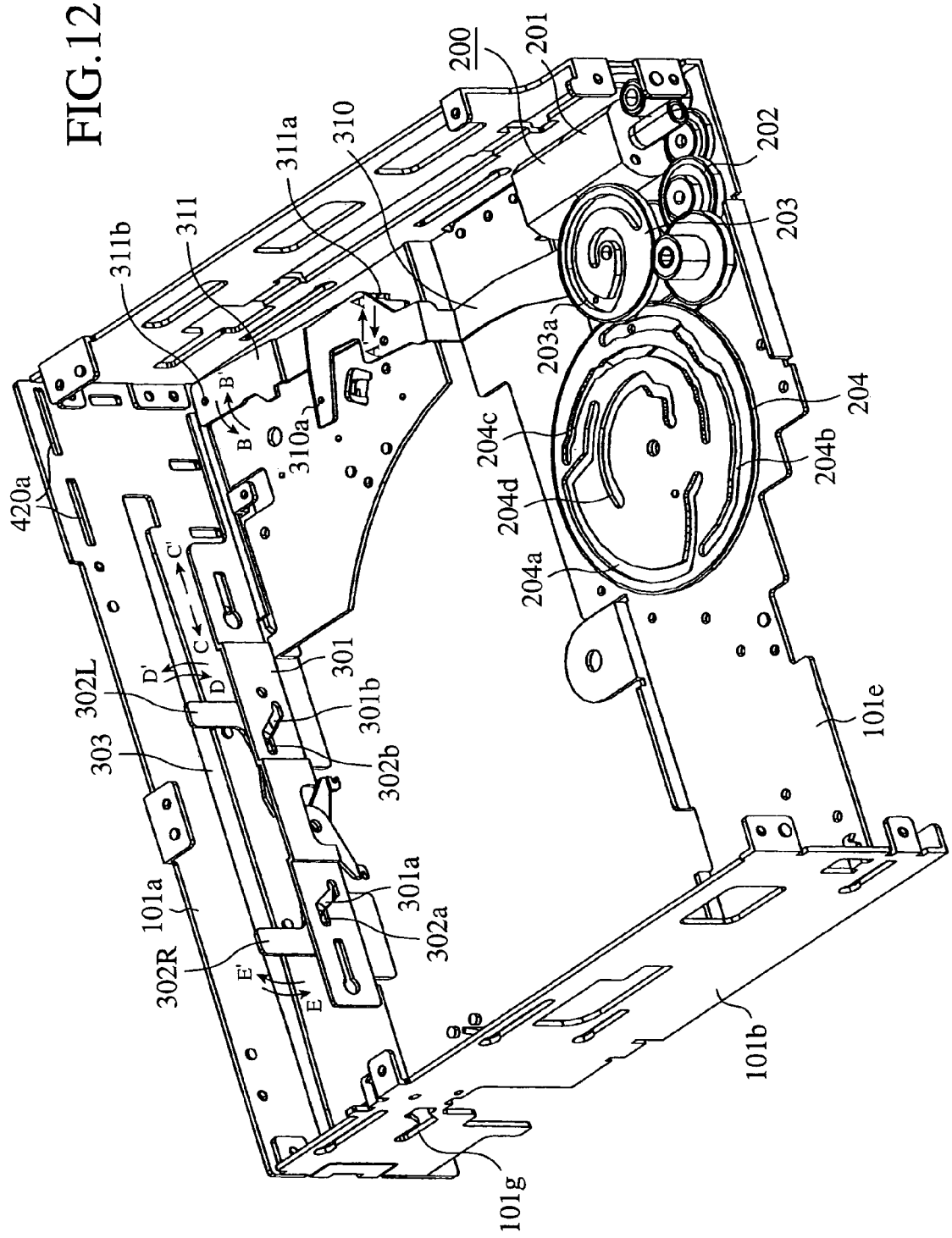
FIG. 12 is a perspective diagram of the disk apparatus when viewed from a right-hand rear side thereof.

Drive mechanism 200:

As shown in FIG. 12, the drive mechanism 200 has a motor 201, as a driving source, disposed at a back corner of a bottom plate 101e of the housing 101, a first rotary member 203 and a second member 204 to which a driving force from the motor 201 is supplied via a gear series 202. A spiral cam groove 203a is formed in the first rotary member 203, and four independent cam grooves 204a, 204b, 204c, and 204d are formed in the second rotary member 204. The gear series 202, and the first and second rotary members 203 and 204 are rotatably supported on the bottom plate 101e of the housing 101.

Figure 34:
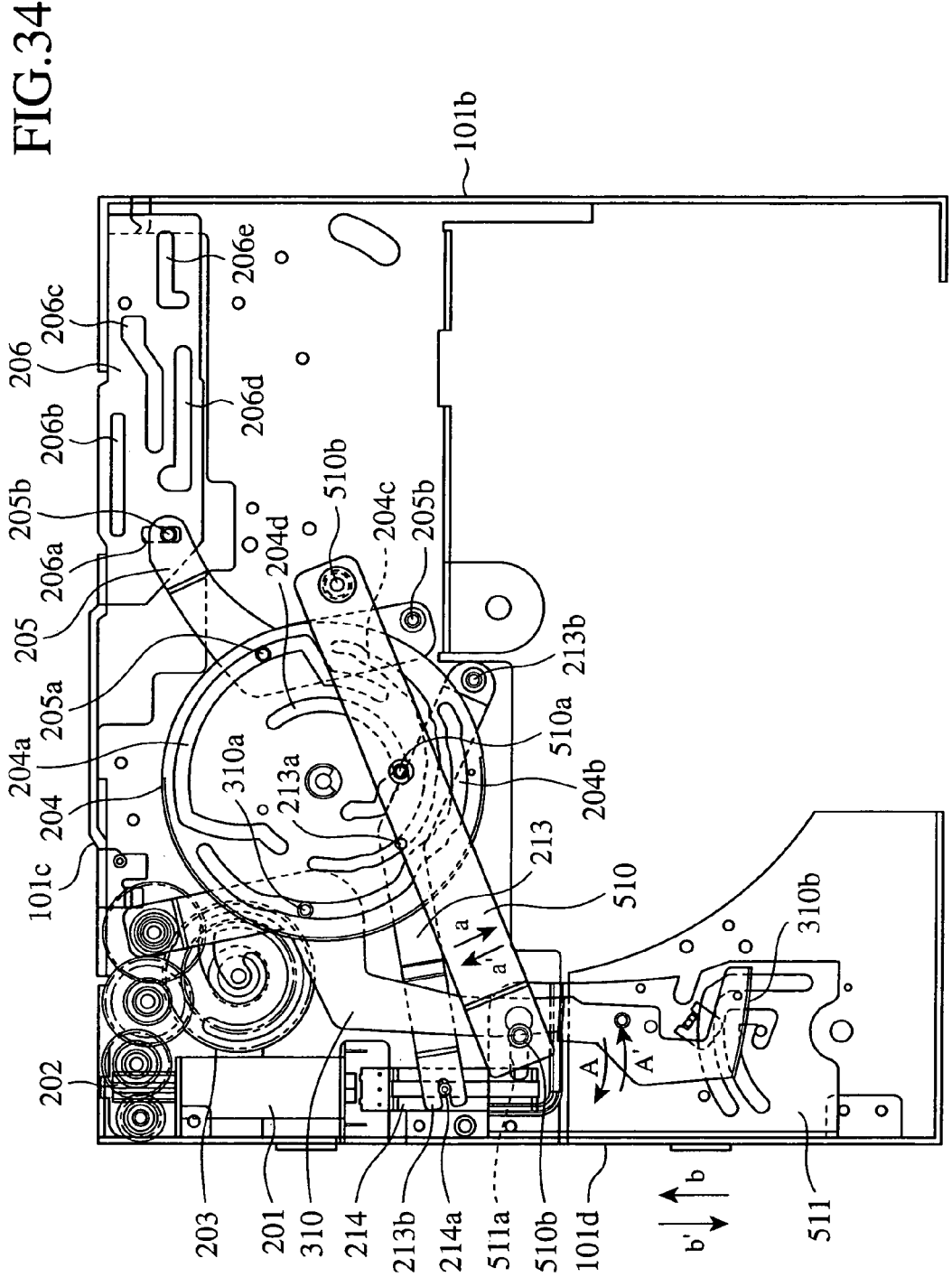
FIG. 34 is a plan view showing a relationship between a cam groove of a second rotary member and a lever engaged with the cam groove.

The cam groove 204a has a middle portion and both end portions which are arc-shaped and concentrically formed in the second rotary member 204, and connecting portions for connecting the middle portion with the both end portions, which are running in a direction of the radius of the second rotary member 204, as shown in FIG. 12. As shown in FIG. 34, a pin 205a disposed at a middle portion of an L-shaped first mechanical driving lever (referred to as a first driving lever from here on) 205, which is disposed under the second rotary member 204, is engaged with the cam groove 204a, and the first driving lever 205 has an end which is rotatably supported by an axis 205b disposed on the bottom plate 101e of the housing 101.

The cam groove 204b has a semicircle arc portion which is formed so that it has much the same radius as the cam groove 204a and is opposite to the cam groove 204a, as shown in FIG. 12. As shown in FIG. 34, a pin 310a disposed at a middle portion of a second mechanical driving lever (referred to as a second driving lever from here on) 310, which is disposed, as a shutter driving lever, under the second rotary member 204, is engaged with the cam groove 204b, and the second driving lever 310 has an end which is rotatably supported by the axis of one gear of the gear series 202.

The cam groove 204c is formed like a semicircle arc so that an end thereof is located in the vicinity of the outer edge of the second rotary member 204 and another end thereof is located in the vicinity of the center of the second rotary member 204, as shown in FIG. 12. As shown in FIG. 34, a pin 213a disposed at a middle portion of a sensor driving lever 213 disposed under the second rotary member 204 is engaged with the cam groove 204c, and the sensor driving lever 213 has an end which is rotatably supported by an axis 213c disposed on the bottom plate 101e of the housing 101.

The cam groove 204d is formed like a semicircle arc having a center on the axis of the second rotary member 204, and is bent at a midpoint thereof so that an end thereof approaches the axis of the second rotary member, as shown in FIG. 12. As shown in FIG. 34, a pin 510a disposed at a middle portion of a third mechanical driving lever (referred to as a third driving lever from here on) 510 disposed above the second rotary member 204 is engaged with the above-mentioned cam groove 204d, and the third driving lever 510 has an end which is rotatably supported by an axis 510b disposed on the bottom plate 101e of the housing 101.

Figure 18:
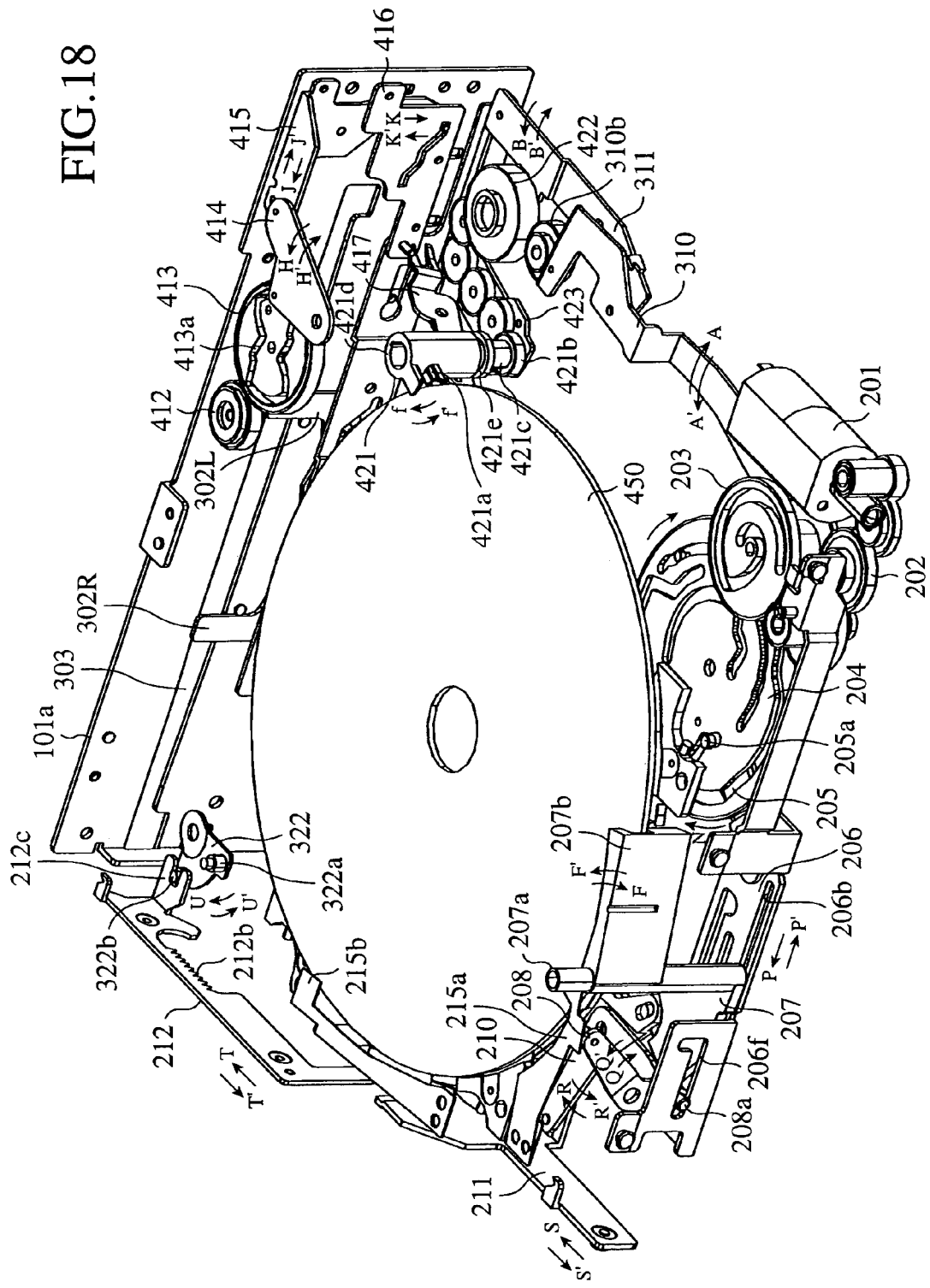
FIG. 18 is a perspective diagram of the disk apparatus when viewed from a left-hand rear side thereof.

The pin 205b disposed on the free end of the first driving lever 205 is engaged with a long hole 206a of the sliding plate 206 which moves in parallel with a rear side plate 101c of the housing 101 and four cam grooves 206b, 206c, 206d, and 206e are formed in the sliding plate 206, as shown in FIG. 34, and an L-shaped cam groove 206f is formed in a rising surface of the sliding plate 206 which is bent at a right angle with respect to the bottom portion in which the four cam grooves 206b, 206c, 206d, and 206e are formed, as shown in FIG. 18. As shown in FIG. 18, a rotary lever 207 has a cylinder 207a which is engaged with the cam groove 206b, and a disk detection plate 207b disposed at an upper portion of the cylinder 207a.

Figure 19:
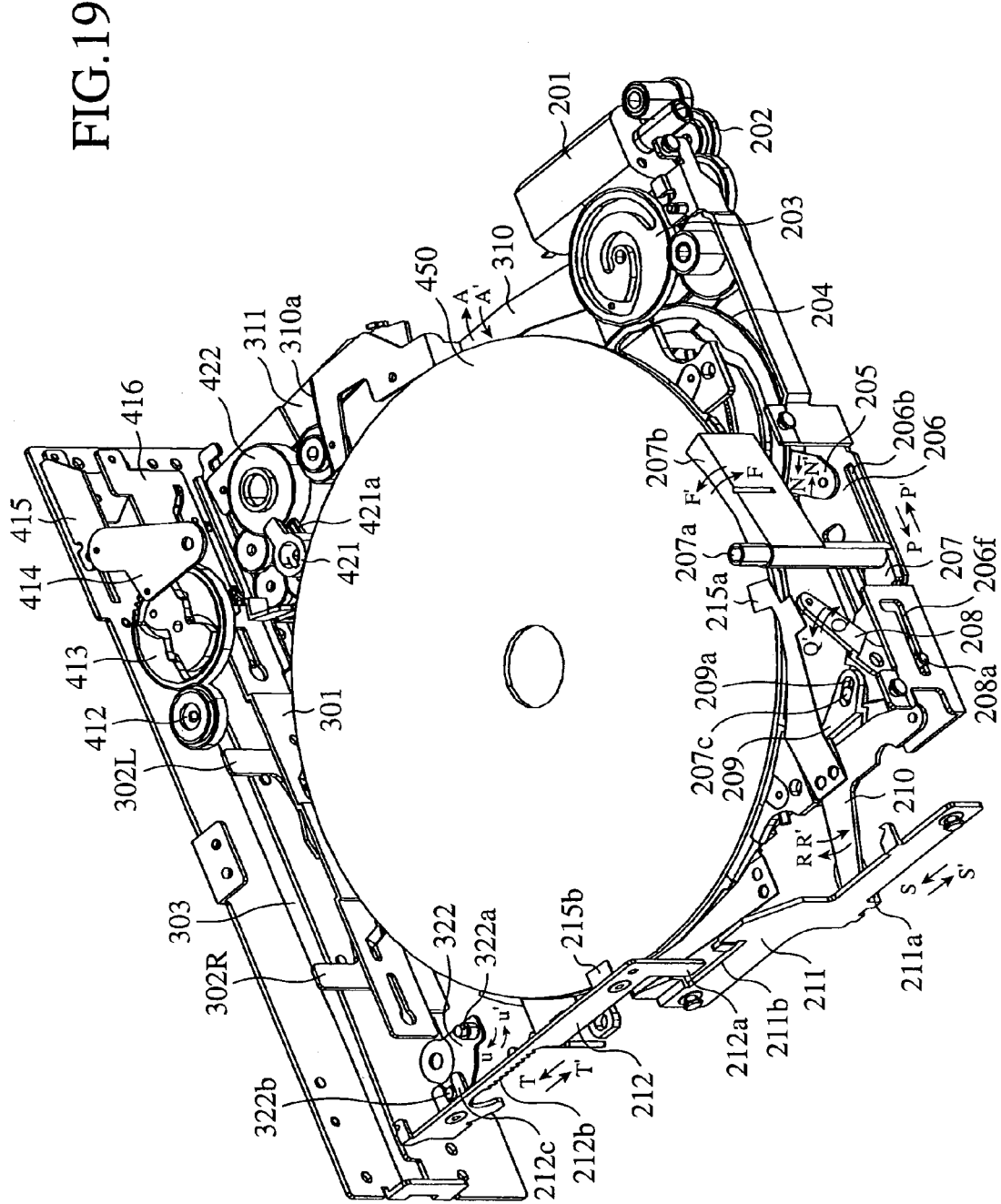
FIG. 19 is a perspective diagram of the disk apparatus when viewed from a right-hand rear side thereof.
Figure 20:
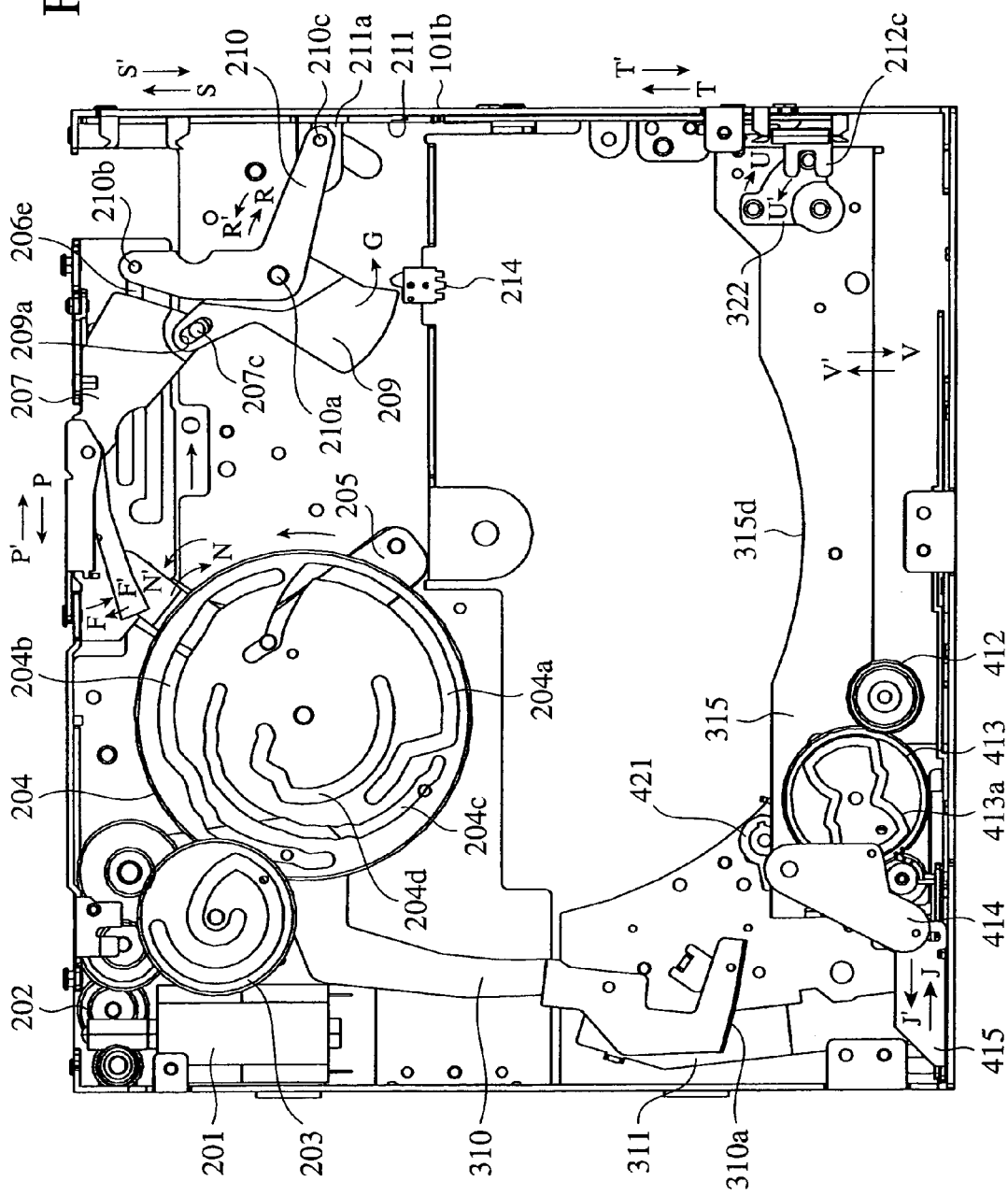
FIG. 20 is a plan view showing the interior of the housing, but in which the top plate is removed.

Referring to FIG. 19, a lever 208 having a pin 208a which is engaged with the L-shaped cam groove 206f is rotatably supported by the rear side plate 101c of the housing 101, and a lever 209 is connected with an end of the lever 207 by way of a pin 207c disposed on the lever 207 and a long hole 209a formed in the level 209. As shown in FIG. 20, an L-shaped lever 210 has a middle portion connected with the lever 209 via a rotation axis 210a, a pin 210b disposed at an end thereof and engaged with the cam groove 206e, and another pin 210c disposed at another end thereof and engaged with a bent forked portion 211a of a sliding plate 211.

The sliding plate 211 is so formed as to slide along the inner surface of the right-hand side plate of the housing 101, and, as shown in FIG. 19, the sliding plate 212 having an engaging portion 212a which is engaged with an upper dented edge portion 211b of the sliding plate 211 is so disposed as to slide along the inner surface of the right-hand side plate of the housing 101. The sliding plate 212 has the rack member 212b and the forked engaging member 212c which is bent at a right angle toward the interior of the housing, as previously mentioned.

Disk insertion/ejection mechanism 300:

As shown in FIG. 12, the disk insertion/ejection mechanism 300 is provided with a cam plate 301 which moves rightward or leftward along the inner surface of the front side plate 101a of the housing, and two cam grooves 301a and 301b are formed in right and left portions of the cam plate 301, respectively. Two shutters 302R and 302L have pins 302a and 302b which are engaged with the cam grooves 301a and 301b of the cam plate 301, respectively, and are rotatably supported by the inner surface of the front side plate 101a of the housing so that the disk insertion/ejection opening 303 formed in the housing front side plate 101a can be opened or closed.

As shown in FIG. 5, the base plate 314 projecting from the inner surface of the front side plate 101a of the housing to the interior of the housing is formed above the disk insertion/ejection opening 303, and the straight line-shaped guide grooves 314a to 314c and the L-shaped guide groove 314d are formed in the both end portions of the base plate 314. The disk conveying plate 315 is disposed below the base plate 314, and the pins 315a to 315c disposed on the upper surface of the disk conveying plate 315 are passed through the guide grooves 314a to 314c, respectively, and the top ends of the pins 315a to 315c are swaged so that they cannot be disconnected from the plurality of guide grooves 314a to 314c, respectively. Thereby, the disk guide plate 315 is hung and supported by the base plate 314. The dented portion 315d is formed like an arc at a central part of the disk conveying plate 315 so that the rim of an inserted disk cannot be in contact with the disk conveying plate 315.

Figure 15:
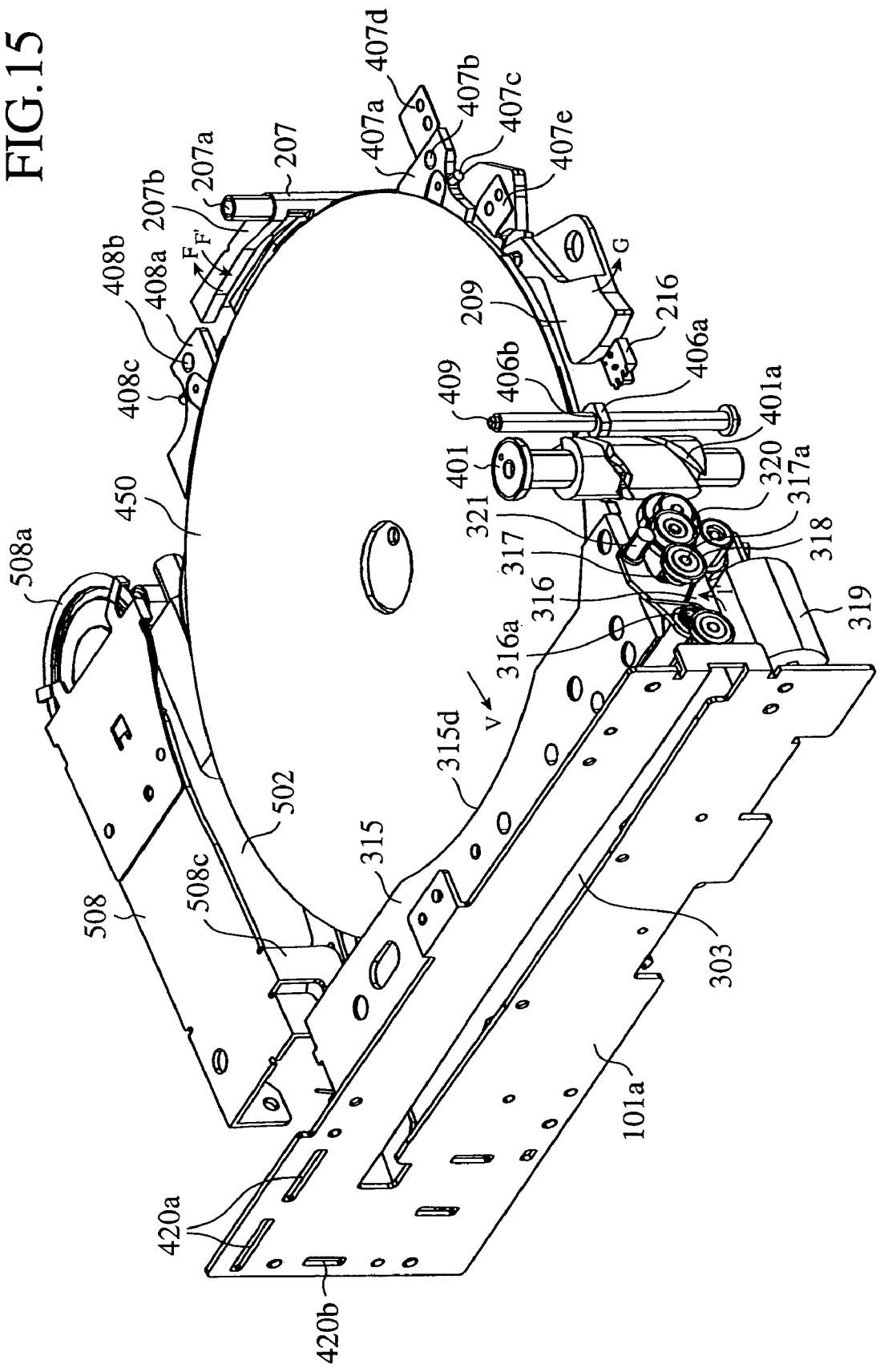
FIG. 15 is a perspective diagram of the disk apparatus when viewed from a right-hand front side thereof.

As shown in FIG. 6, the rotary levers 316 are attached to the both ends of the disk conveying plate 315 via the axis 316a, and the disk conveying roller 317 is disposed in parallel with the axis 316a between the rotary levers 316. The disk guide plate 315 and the disk conveying roller 317 are arranged so that the gap between them is positioned at much the same level as the disk insertion/ejection opening 303. The power transfer gear 318 is attached to the axis 317a of the disk conveying roller 317 projecting outside from one of the rotary levers 316, and the gear series 320 for transmitting a rotary force from a motor 319, as shown in FIG. 15, which is mounted to the inner surface of the right-hand side plate 101b of the housing, is engaged with the gear 318. The guide pin 321, as well as the gear 318, is disposed on the rotary lever 316, and the guide pin 321 is engaged with the cam groove 101g formed in the right-hand side plate 101b of the housing.

The locking lever 322 is rotatably supported on a right-hand side portion of the upper surface of the disk conveying plate 315 to which the gear series 320 shown in FIG. 15 is mounted, the pin 322a disposed on the locking lever 322 is engaged with the L-shaped guide groove 314d of the base plate 314 shown in FIG. 9, and the forked engaging member 212c of the sliding plate 212 is engaged with the pin 322b disposed on the locking lever 322, as shown in FIG. 18. The rack member 212b formed in the sliding plate 212 is engaged with one gear of the gear series 320.

Figure 13:
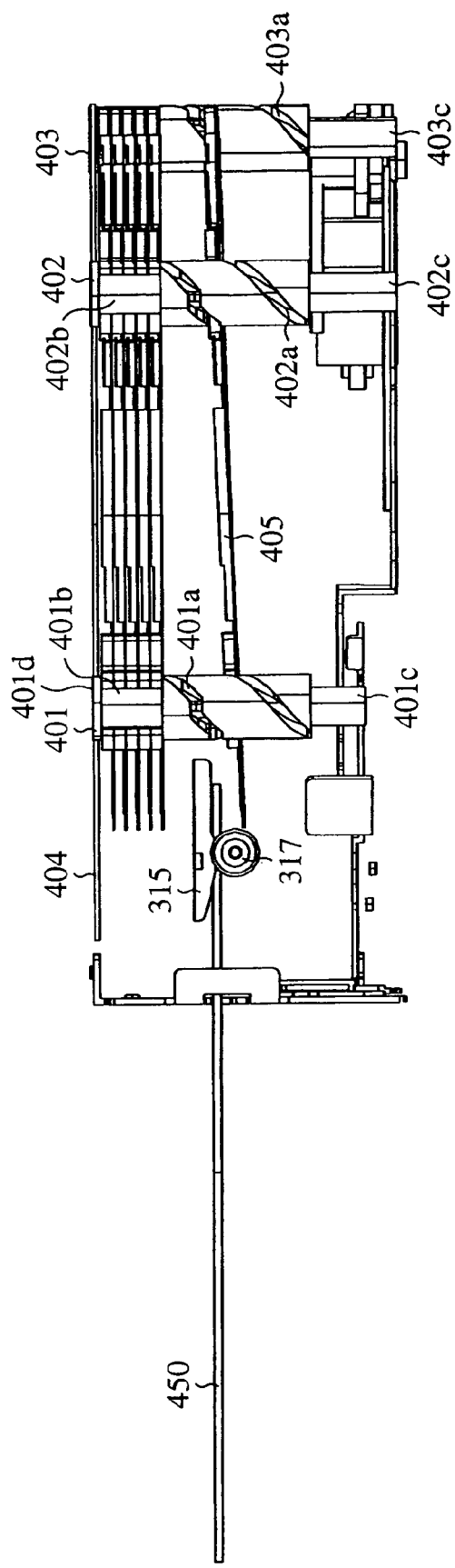
FIG. 13 is a side view showing a right-hand side of the disk apparatus, but in which a right-hand side plate is removed.
Figure 14:
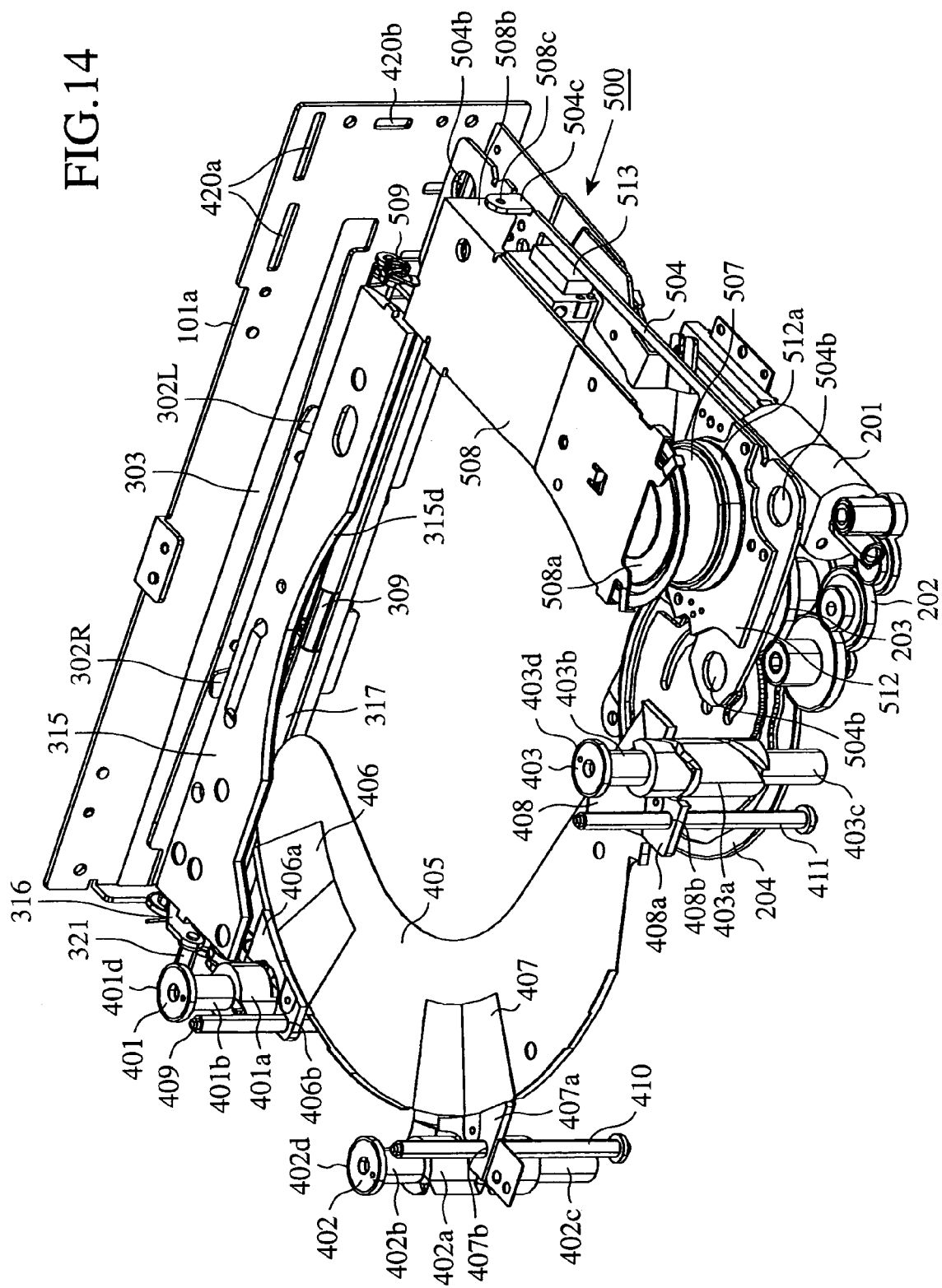
FIG. 14 is a perspective diagram of the disk apparatus when viewed from a left-hand rear side thereof.

Disk Changer Mechanism 400:

In the disk changer mechanism 400, three disk upward/downward moving members (referred to as rotation axes from here on) 401, 402, and 403 are supported at positions having angles of about 0 degrees, 90 degrees, and 180 degrees with respect to a diagonal line connecting between a right end of the front side plate and a left end of the rear plate, and between the bottom plate 101d and top plate 102 of the housing, as shown in FIGS. 13 and 14. Small-diameter portions 401b, 402b, and 403b having a height enough to accommodate a predetermined number of disks 450 (for example, five disks) are formed in upper parts of the rotation axes 401, 402, and 403, respectively, and small-diameter portions 401c, 402c, and 403c are also formed in lower parts of the rotation axes, respectively. Step-wise spiral grooves 401a, 402a, and 403a are formed in the outer surfaces of large-diameter middle portions of the rotation axes, respectively.

Figure 35:
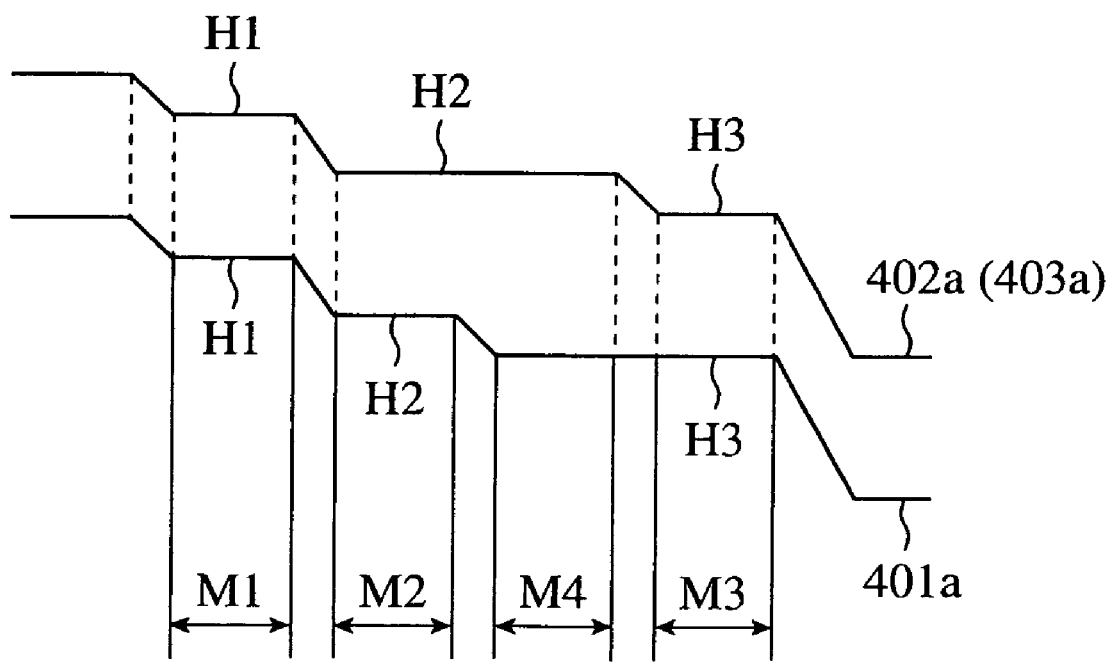
FIG. 35 is an expansion plan of spiral grooves for moving a stocker upward or downward.

While the step-wise spiral grooves 402a and 403a formed in the outer surfaces of the large-diameter middle portions of the two rotation axes 402 and 403 located on the back side of the housing have an identical shape, the step-wise spiral groove 401a of the rotation axis 401 located on the front side of the housing switches from a step H2 to another step H3 at an earlier time than those 402a and 403a formed in the rotation axes 402 and 403, as shown in FIG. 35. By virtue of this structure, the front side of the disk being held by the disk apparatus becomes lower than the back side of the disk at timing when the step-wise spiral groove 401a of the rotation axis 401 switches from the step H2 to the other step H3. The rotation axes 401, 402, and 403 have gears 401d, 402d, and 403d at the top ends thereof, respectively, and the gears 401d, 402d, and 403d are engaged with one large-diameter gear 404. In FIG. 35, H1 denotes a playback unit entry level (i.e., an elevation position where the disk supported by a stocker 405 and the disk guide member 421 is placed above the turntable 507 so that the disk does not interfere with movements of the turntable 507), H2 denotes a disk chugging level (i.e., an elevation position where the disk placed on the turntable 507 is pressed by the damper 508a), and H3 denotes a playback unit retraction level (i.e., an elevation position where the disk supported by a stocker 405 and the disk guide member 421 is placed when the turntable 507 is retracted to beside the disk). Furthermore, M1 denotes a playback unit entry mode in which the turntable 507 is moved to a position where it supports the disk, M2 denotes a disk chugging mode in which the disk placed on the turntable 507 is pressed and held by the damper 508a, M3 denotes a playback unit retraction mode in which the turntable 507 is retracted to beside the disk, and M4 denotes a disk insertion/ejection mode in which a disk is inserted into the disk apparatus or a disk is ejected from the disk apparatus.

Figure 11:
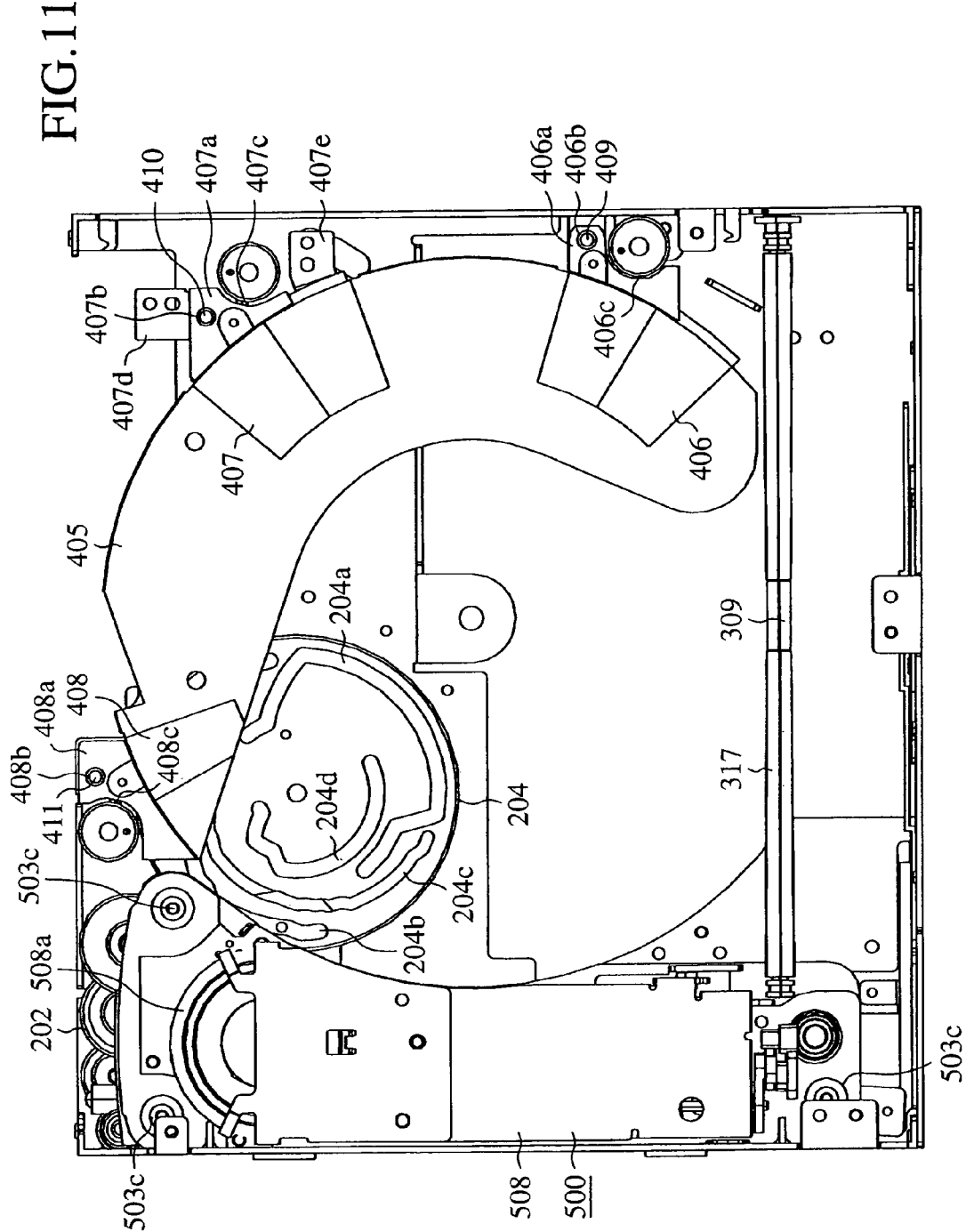
FIG. 11 is a plan view showing the interior of the housing, but in which the top plate is removed.

Each of a plurality of stockers 405 for supporting a disk 450 is constructed of an arc-shaped sheet material, which is shaped like a part of a circle whose more than half of its area including a center is removed. Each stocker 405 has supporting members 406, 407, and 408 which are attached to parts thereof having angles of about 0 degrees, 90 degrees, and 180 degrees with respect to the diagonal line connecting between the right end of the front side plate and the left end of the rear plate, respectively. As shown in FIGS. 11 and 15, projecting portions 406a, 407a, and 408a which are projecting outwardly from the supporting members 406, 407, and 408, respectively, have holes 406b, 407b, and 408b through which guide pins 409, 410, and 411 installed in the vicinity of the rotation axes 401, 402, and 403 are passed, and pins 406c, 407c, and 408c which are engaged with the spiral grooves 401a, 402a, and 403a formed in the rotation axes 401, 402, and 403, respectively. Furthermore, attachment arms 407d and 407e to which stocker flat springs 215a and 215b are attached are disposed on the projecting member 407a.

By virtue of this structure, the large-diameter gear 404 rotates according to the driving force of the motor 418 by way of the gear series 419, and therefore the rotation axes 401, 402, and 403 simultaneously rotate by way of the gears 401d, 402d, and 403d, respectively. As a result, each stocker 405 can be made to move upward or downward along the spiral grooves 401a, 402a, and 403a. While each stocker 405 is moved upward or downward, the difference in level between the step-wise spiral grooves 402a and 403a of the rotation axes 402 and 403 located on the back side of the housing, and the step-wise spiral groove 401a of the rotation axis 401 located on the front side of the housing can cause the front side of the disk 450 being held by each stocker 405 to point downward.

Figure 16:
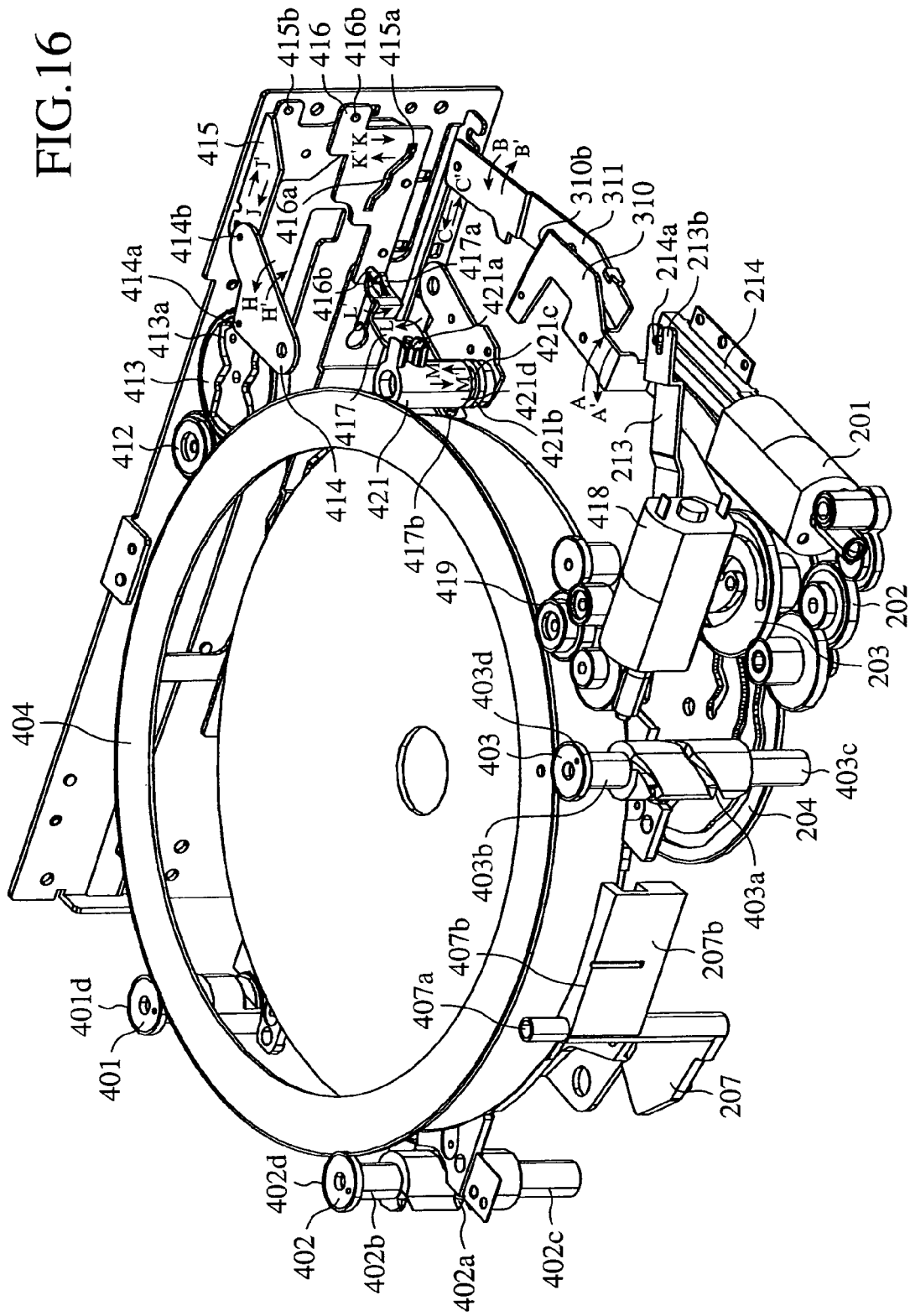
FIG. 16 is a perspective diagram of the disk apparatus when viewed from a left-hand rear side thereof.

As shown in FIG. 16, the disk changer mechanism 400 is further provided with a gear 412 which is disposed in the vicinity of the disk insertion/ejection opening 303 and is engaged with the large-diameter gear 404, a gear 413 which is engaged with the gear 412, a shaking lever 414 having a pin 414a which is engaged with an 8-shaped cam groove 413a formed in the gear 413, a sliding plate 415 which is connected with the shaking lever 414 via a pin 414b of the shaking lever 414, and which slides rightward or leftward along the front side plate 101a of the housing, a sliding plate 416 in which a cam groove 416a engaged with a pin 415a of the sliding plate 415 is formed, the sliding plate 416 sliding upward or downward along the front side plate 101a of the housing, and a rotary plate 417 having a forked portion 417a at an end thereof, which is engaged with a pin 416b of the sliding plate 416.

The gears 412 and 413 and the shaking lever 414 are supported by the top plate 102 of the housing, and pins 415b formed in left-hand and right-hand end portions of the sliding plate 415 are engaged with horizontal long holes 420a of the front side plate 101a of the housing, respectively, as shown in FIG. 8. Furthermore, a pin 416a disposed on the sliding plate 416 is engaged with a perpendicular long hole 420b formed in the front side plate 101a of the housing, as shown in FIG. 8.

Referring now to FIG. 18, a gear series 422 that connects a gear 310b disposed at an end of the second driving lever 310 with a gear 421b disposed under a disk guide member 421 is rotatably supported on a rotation axis supporting plate 423 which is disposed on the bottom surface 101e of the housing. The above-mentioned rotary plate 417 is rotatably supported on a perpendicular bent portion of the rotation axis supporting plate 423. In the above-mentioned disk guide member 421, an external cylinder 421d is slipped over an axial member 421c having the gear 421b, a sandwiching portion 421a for sandwiching the disk is disposed on an upper outer face portion of the external cylinder 421d, and a pin 417b which is protruded from the rotary plate 417 is engaged with a lower outer face portion of the external cylinder 421d. By virtue of this structure, the disk guide member 421 can be rotated and moved upward or downward.

Figure 23:
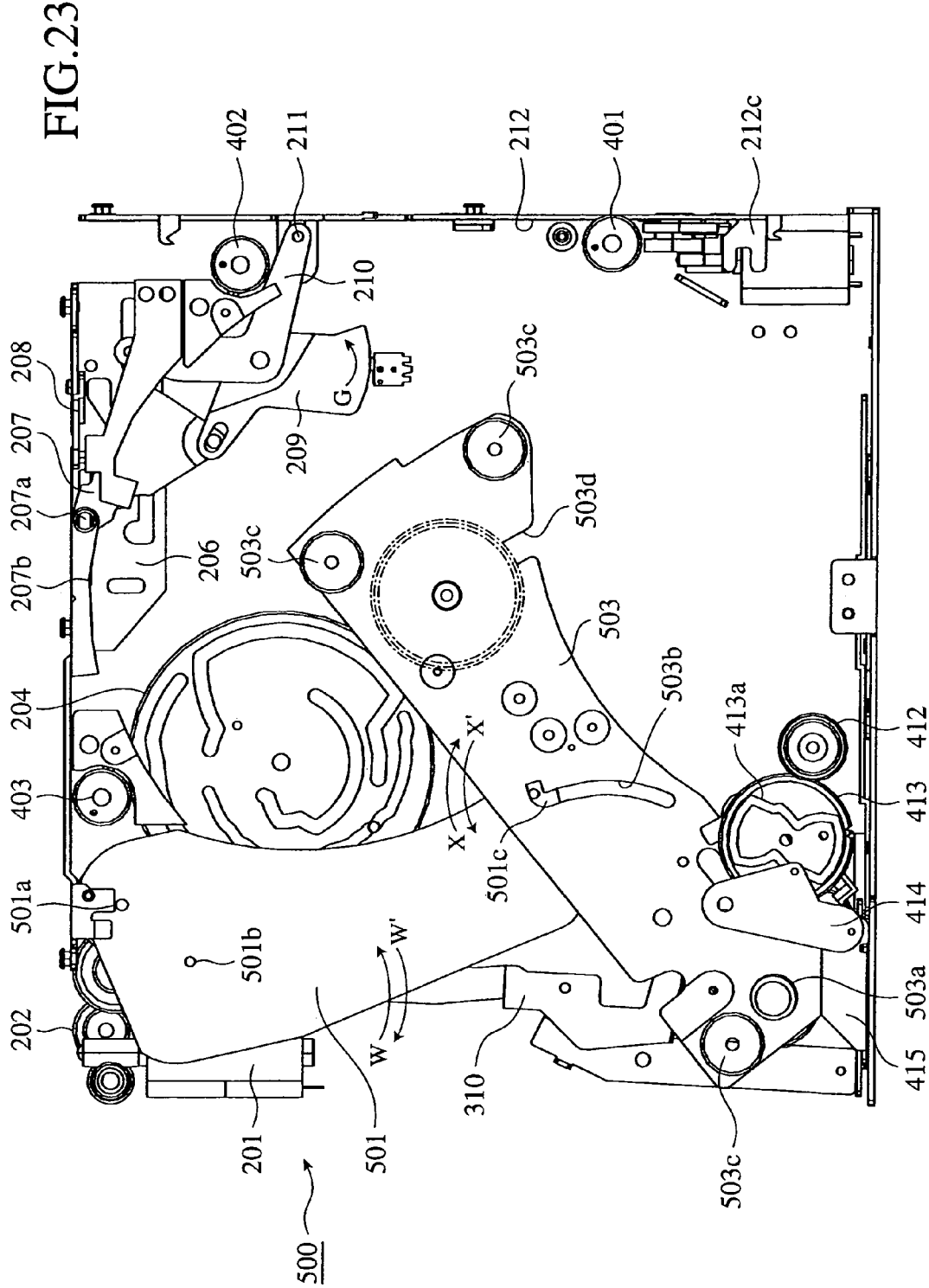
FIG. 23 is a plan view showing the interior of the housing in which the playback unit is made to rotate toward a playback position.
Figure 24:
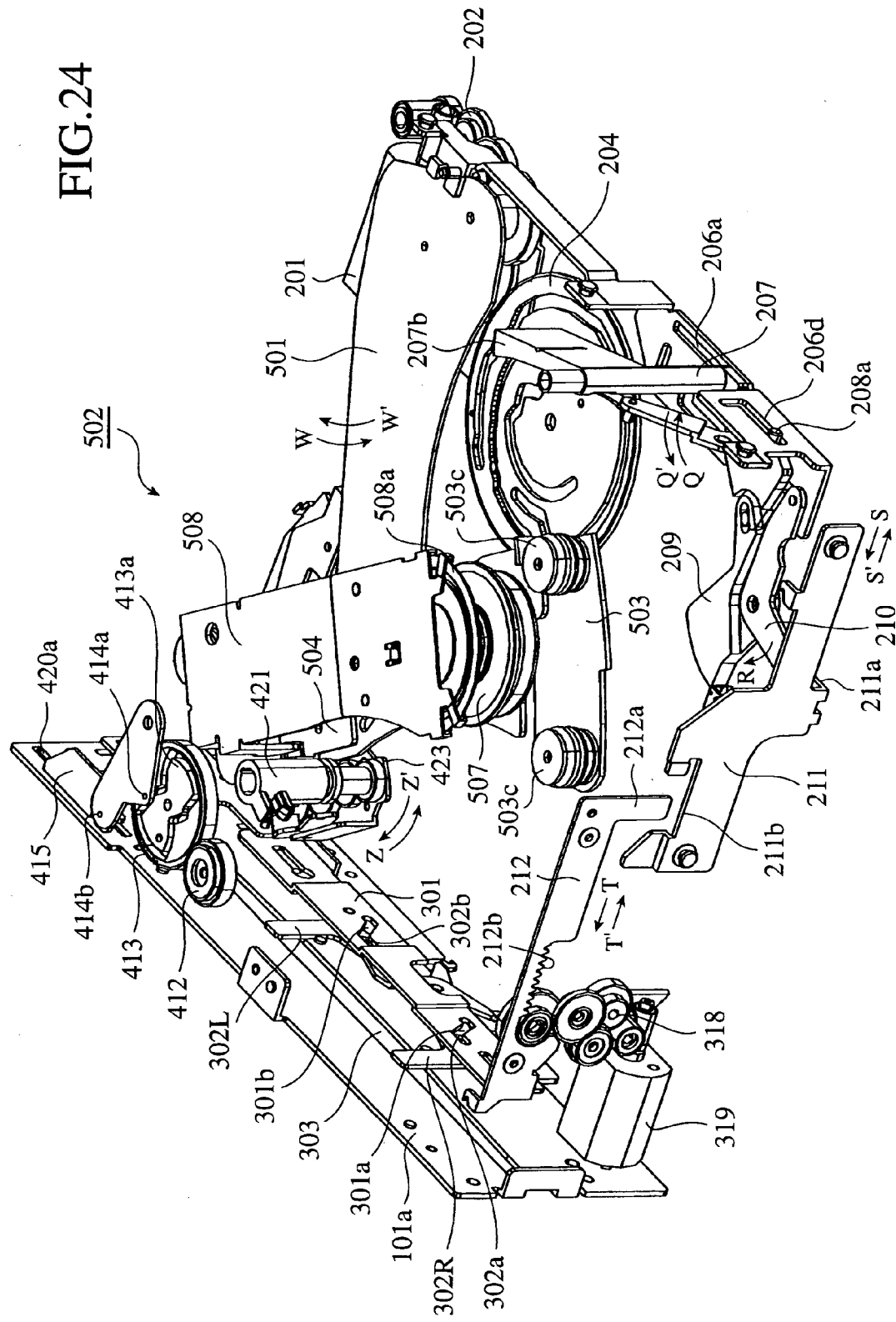
FIG. 24 is a perspective diagram of the disk apparatus when viewed from a right-hand rear side thereof.

Playback Unit 500:

The playback unit 500 has a rotary lever 501, as shown in FIG. 23, having an end which is rotatably supported by an axis 110 of FIG. 10 disposed in the housing 101 and a pin 501b which is disposed thereon and is engaged with the cam groove 203a of the first rotary member 203, and a playback member 502, as shown in FIG. 24, which is moved from its retraction position which is located outside an area including the disk to the disk playback position by the rotary lever 501. The playback member 502 has a playback member supporting plate 503 and a supporting plate 504, as shown in FIG. 24, and the both plates have holes 503a and 504a formed at end portions thereof into which the axis 110 vertically disposed on the bottom plate 101e of the housing 101 is rotatably engaged, respectively, as shown in FIGS. 10 and 23.

Figure 31:
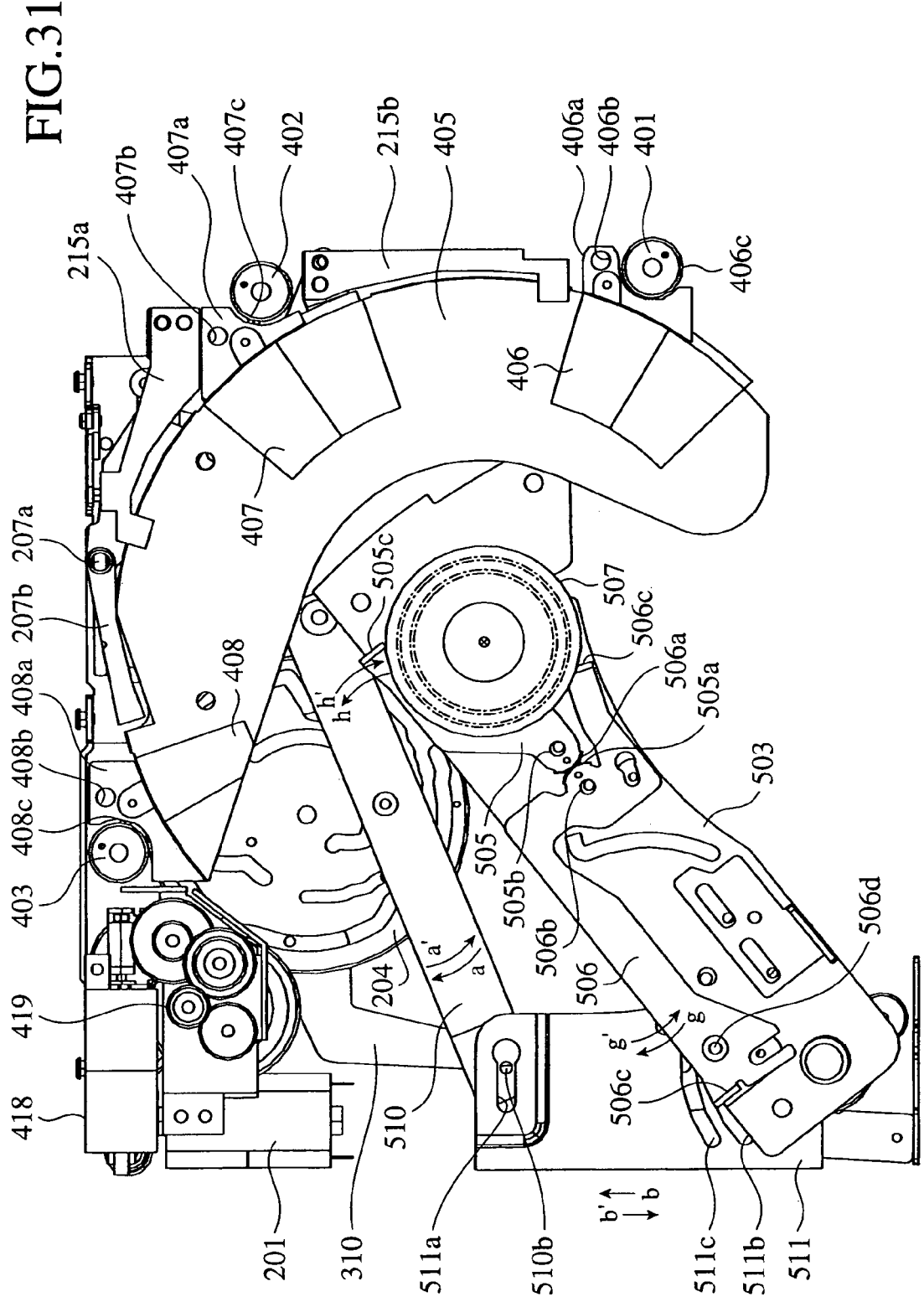
FIG. 31 is a plan view showing the interior of the housing, but in which the top plate is removed.

As shown in FIG. 23, a cam groove 503b which is engaged with a pin 501c disposed on the above-mentioned rotary lever 501 is formed in the playback member supporting plate 503, and impact-absorbing members 503c are disposed on both a leading edge portion and a base edge portion of the playback member supporting plate 503. In the vicinity of the leading edge portion of the playback member supporting plate 503, a cut groove 503d which is engaged with a disk center positioning member 103, as shown in FIGS. 8 to 10, which is disposed on the bottom plate 101e of the housing 101 is formed. Furthermore, locking members 505 and 506 having gears 505a and 506a which are engaged with each other are rotatably supported by the playback member supporting plate 503 by way of the rotation axes 505b and 506b of the gears 505a and 505b, respectively, as shown in FIG. 31. Engagement members 505c and 506c having engagement dented portions are formed at free end portions of the locking members 505 and 506 so that they are perpendicularly bent with respect to the main portions of the locking members 505 and 506, respectively.

As shown in FIG. 14, the supporting plate 504 has a leading edge portion and a base edge portion in which holes 504b engaged with the upper ends of the impact-absorbing members 503c of the playback member supporting plate 503 shown in FIG. 23 are formed, and a turntable 507 that makes the disk placed thereonto rotate is disposed in the vicinity of the leading edge portion of the supporting plate 504. The turntable 507 is arranged on the axis of a disk type motor 512a disposed on a circuit board 512. A reading unit (i.e., a pickup) 513 that can move between the base edge portion and leading edge portion of the supporting plate 504 so as to read the contents of the disk 450 is disposed.

Furthermore, perpendicularly-bent portions 508b are disposed on both sides of a back end portion of a clamp plate 508 and are rotatably supported via an axis 508c by perpendicularly-bent portions 504c which are disposed on both sides of the base edge portion of the supporting plate 504, respectively. The clamp plate 508 has a leading end portion on which a damper 508a for pressing the disk toward the turntable 507 so as to hold the disk is disposed so that the clamper can shake, and a coil spring 509 for pressing the clamper 508a toward the turntable 507 is disposed on the back end portion of the clamp plate 508.

Figure 26:
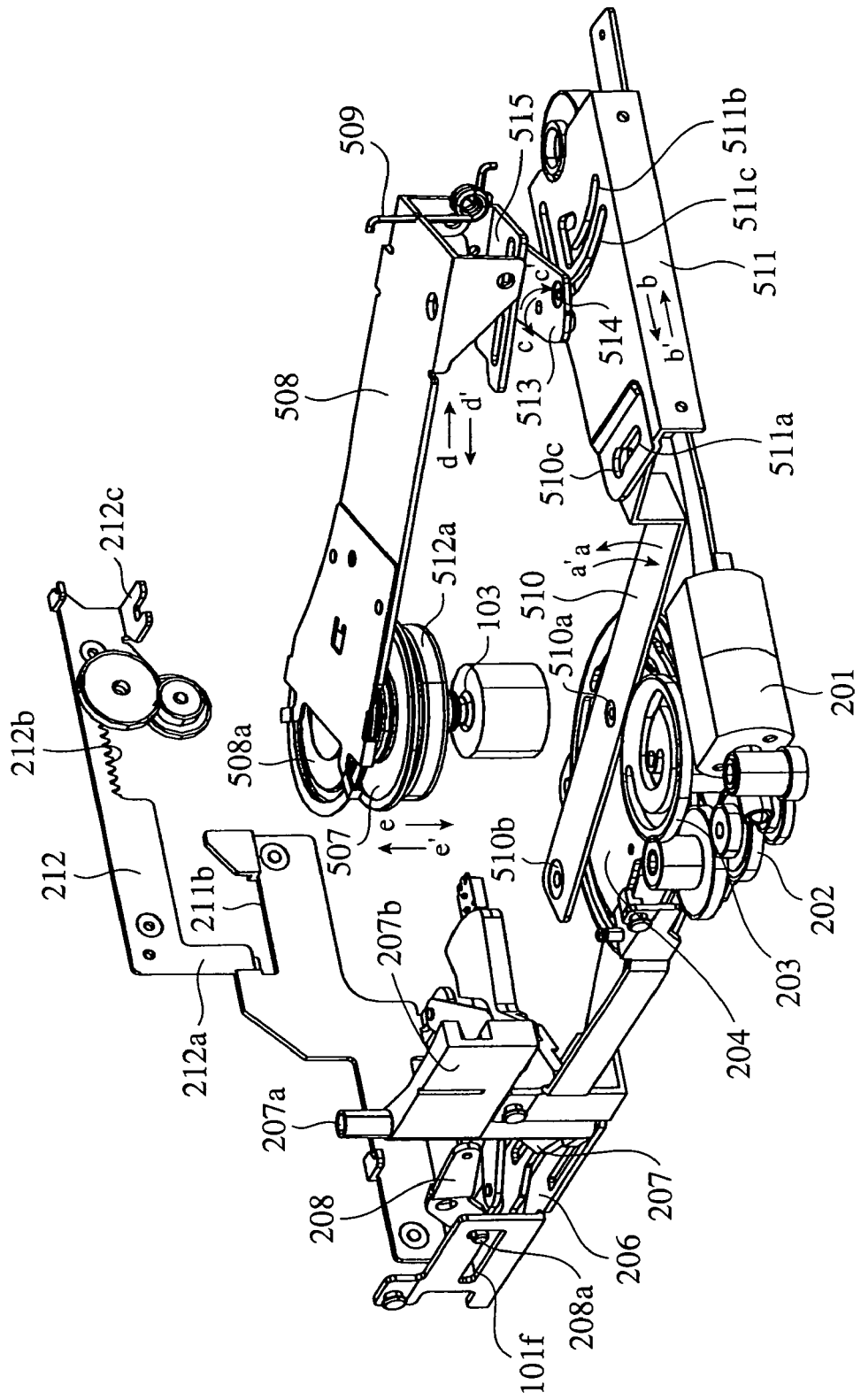
FIG. 26 is a perspective diagram of the disk apparatus when viewed from a left-hand rear side thereof.

As shown in FIG. 26, a driving lever 511 that slides along the inner surface of the left-hand side plate of the housing is connected with the leading end of the third driving lever 510 via engagement between a pin 510c and a long hole 511a, and a cam groove 511b for locking operation and a cam groove 511c for disk chugging operation are formed in the upper surface of the sliding member 511. Furthermore, a pin 506d disposed on the locking member 506 shown in FIG. 31 is engaged with the cam groove 511b for locking operation, and a driving plate 515 and a connecting plate 513 which are disposed on the clamp plate 508 are connected so that they can shake. A pin 514 disposed on the connecting plate 513 is engaged with the cam groove 511c for disk chugging operation.

Next, operations of the disk apparatus in accordance with this embodiment of the present invention will be explained.

Operations of Inserting a Disk Into the Disk Apparatus, and Placing the Disk at the Playback Position:

First, a switch not shown in the figures is closed and the motor 201 shown in FIG. 12 is started. The motor 201 then makes the first and second rotary members 203 and 204 rotate by way of the gear series 202. As shown in FIG. 12, the rotation of the second rotary member 204 results in rotation of the second driving lever 310 engaged with the cam groove 204b in a direction of an arrow A, a middle lever 311 is therefore made to rotate in a direction of an arrow B, and the cam plate 301 is made to move in a direction of an arrow C. As a result, the shutters 302R and 302L having their respective pins 302a and 302b engaged with the cam grooves 301a and 301b of the cam plate 301 are made rotate in directions of arrows D and E, respectively, and the disk insertion/ejection opening 303 is then opened.

At this time, as shown in FIGS. 13 and 15, the playback unit 500 is retracted to outside an area where the disk can be moved, the disk conveying plate 315 is placed on a side of the front side plate of the housing 101, and a desired or selected stocker 405 is moved to a disk conveyance level at which the disk can be conveyed. Furthermore, only a part of the desired stocker which is engaged with the spiral groove 401a of the rotation axis 401, which is the closest to the disk insertion/ejection opening 303, is moved downward to the playback unit retraction level.

In this state, when a sensor not shown in the figures detects the disk inserted into the disk apparatus via the disk insertion/ejection opening 303, the motor 319 of FIG. 15 is started in response to a detection signal from the sensor, and then rotates the roller 317 by way of the gear series 318. As a result, the upper and lower surfaces of the disk are guided by the disk conveying plate 315 and the selected stocker 504, and the right-hand and left-hand sides of the disk are guided by the rotation axis 401 and a side wall of the clamp plate 508 of FIG. 14, so that the disk is conveyed to the inner side of the housing 101. As shown in FIG. 34, detection of which mode the second rotary member 204 is placed in is performed by using the sensor driving lever 213 which is engaged with the cam groove 204c of the second rotary member 204 by way of the pin 213a, and the position sensor 214 having the pin 214a which is engaged with the forked member 213b disposed at the leading end of the sensor driving lever 213.

When the inserted disk 450 is conveyed to a predetermined position, the disk detection plate 207b is pushed by the disk and is then made to rotate in a direction of an arrow F, and the switch lever 209 is made to rotate in a direction of an arrow G by way of the lever 207, as shown in FIG. 15. As a result, a switch 216 is closed.

Then, as shown in FIG. 12, further rotation of the second rotary member 204 caused by further driving of the motor 201 rotates the second driving lever 310 in a direction of an arrow A', rotates the middle lever 311 in a direction of an arrow B', and moves the cam plate 301 in a direction of an arrow C'. As a result, the shutters 302R and 302L of FIG. 11 are made to project toward the disk insertion path, and the disk insertion/ejection opening 303 is then closed.

Figure 17:
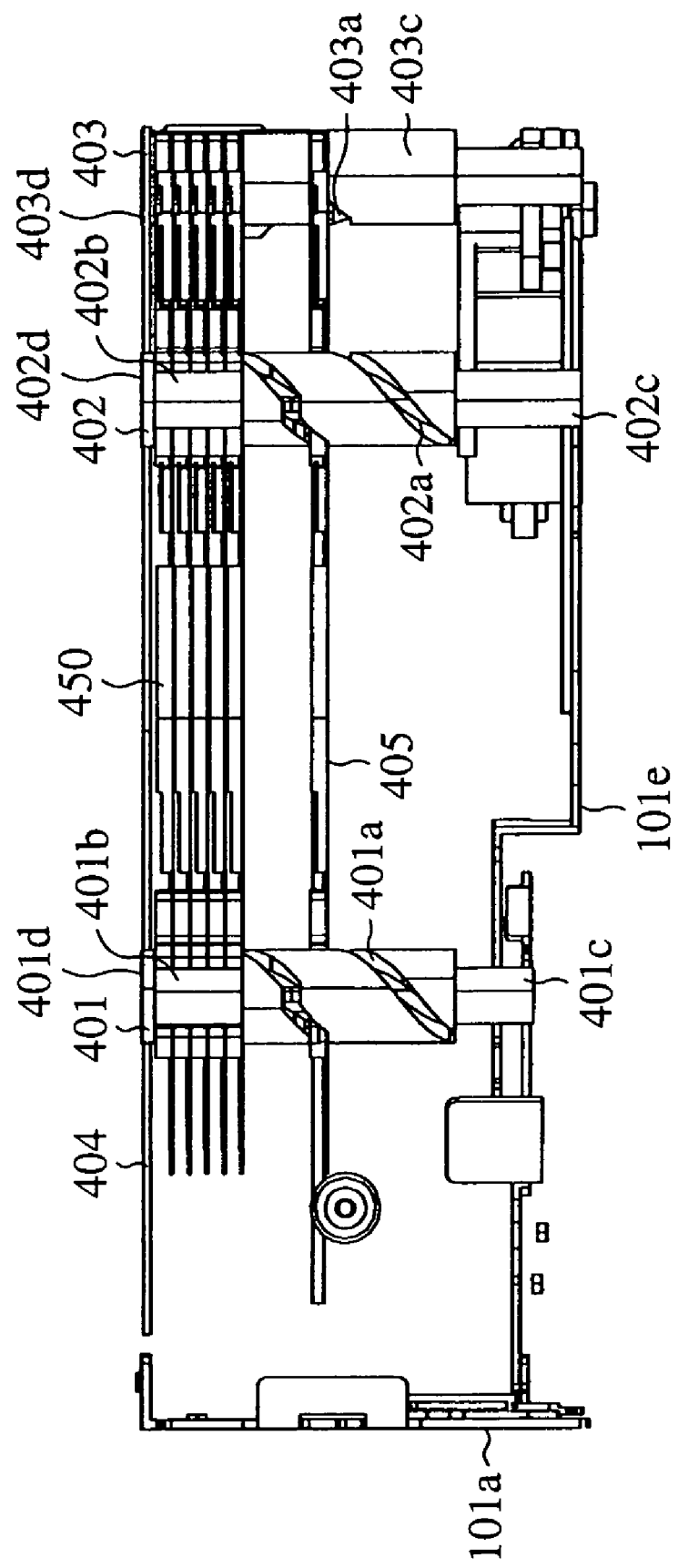
FIG. 17 is a side view showing the right-hand side of the disk apparatus, but in which the right-hand side plate is removed at a time of disk installation.

On the other hand, when the motor 418 is started in response to a close signal from the switch 216, the rotation axes 401, 402, and 403 are made to rotate by way of the gear series 419, the large-diameter gear 404, and the gears 401d, 402d, and 403d, as shown in FIG. 16, and the disk insertion side of the selected stocker 504 is moved back to the disk conveyance level by way of the pins 406c, 407c, and 408c of the projecting portions of the supporting members which are respectively engaged with the spiral grooves 401a, 402a, and 403a of the rotation axes 401, 402, and 403, as shown in FIG. 17.

Simultaneously, the gear 412 is made to rotate and the shaking lever 414 having the pin 414a which is engaged with the 8-shaped cam groove 413a of the gear 413 engaged with the gear 412 is also made rotate in a direction of an arrow H. Movement of the sliding plate 415 in a direction of an arrow J, movement of the sliding plate 416 in a direction of an arrow K, and rotation of the rotary plate 417 in a direction of an arrow L, which are caused by the rotation of the shaking lever 414, results in an upward movement of the disk guide member 421 in a direction of an arrow M to the disk conveyance level, as shown in FIG. 16.

Then, as shown in FIG. 18, further rotation of the second rotary member 204 caused by further driving of the motor 201 rotates the first driving lever 205 in a direction of an arrow N, and moves the sliding plate 20 in a direction of an arrow P. As a result, the disk detection plate 207b is rotated and retracted in a direction of an arrow F. Pressures by the stocker flat springs 215a and 215b which press the disk toward the stocker are released by further movement of the sliding plate 206 in the direction of the arrow P, movement of the lever 208 in a direction of an arrow Q, movement of the L-shaped lever 210 in a direction of an arrow R, and movement of the sliding plate 211 in a direction of an arrow S. As a result, the sliding plate 212 is brought into contact with the sliding plate 211, and the sliding plate 212 is pressed by the sliding plate 211.

As a result, as shown in FIGS. 18 and 19, the sliding plate 212 is made to travel a predetermined distance in a direction of an arrow T, and the forked engaging member 212c makes the locking member 322 rotate in a direction of an arrow U. As a result, the engagement between the pin 322b and the L-shaped groove 314d is released. Simultaneously, the second driving lever 310 is made to rotate in the direction of the arrow A, and the disk guide member 421 is made to rotate in a direction of an arrow f by way of the gear series 422. As a result, the disk 450 is sandwiched by the sandwiching portion 421a of the disk guide member 421, as shown in FIG. 18. Then, when the motor 319 is started, the sliding plate 212, in which the rack 212b is pushed and moved by the sliding plate 211 and is then engaged with one gear of the gear series 320, moves the disk conveying plate 315 toward the disk insertion/ejection opening (i.e., in a direction of an arrow V of FIG. 15) in response to the driving force from the motor 319.

Figure 21:
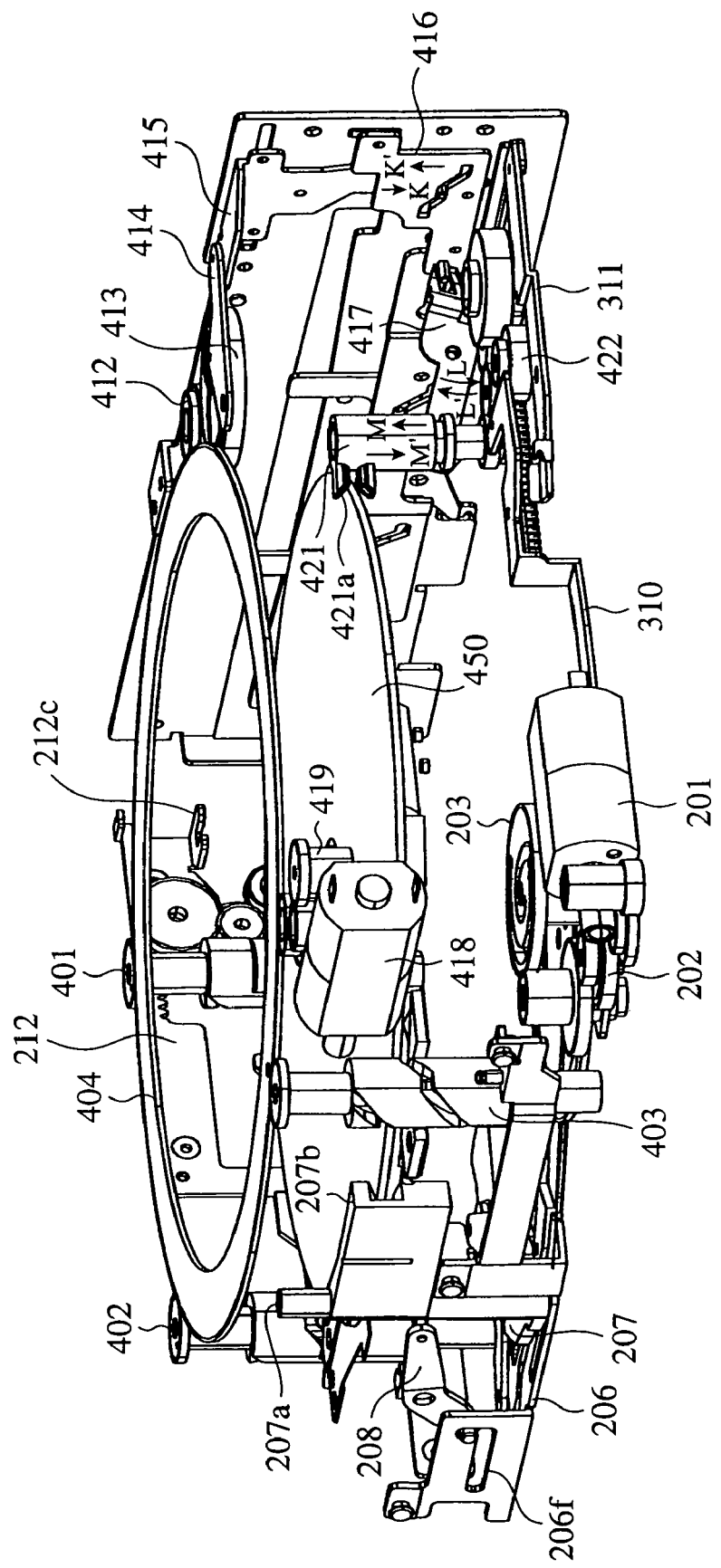
FIG. 21 is a perspective diagram of the disk apparatus when viewed from a left-hand rear side thereof.
Figure 22:
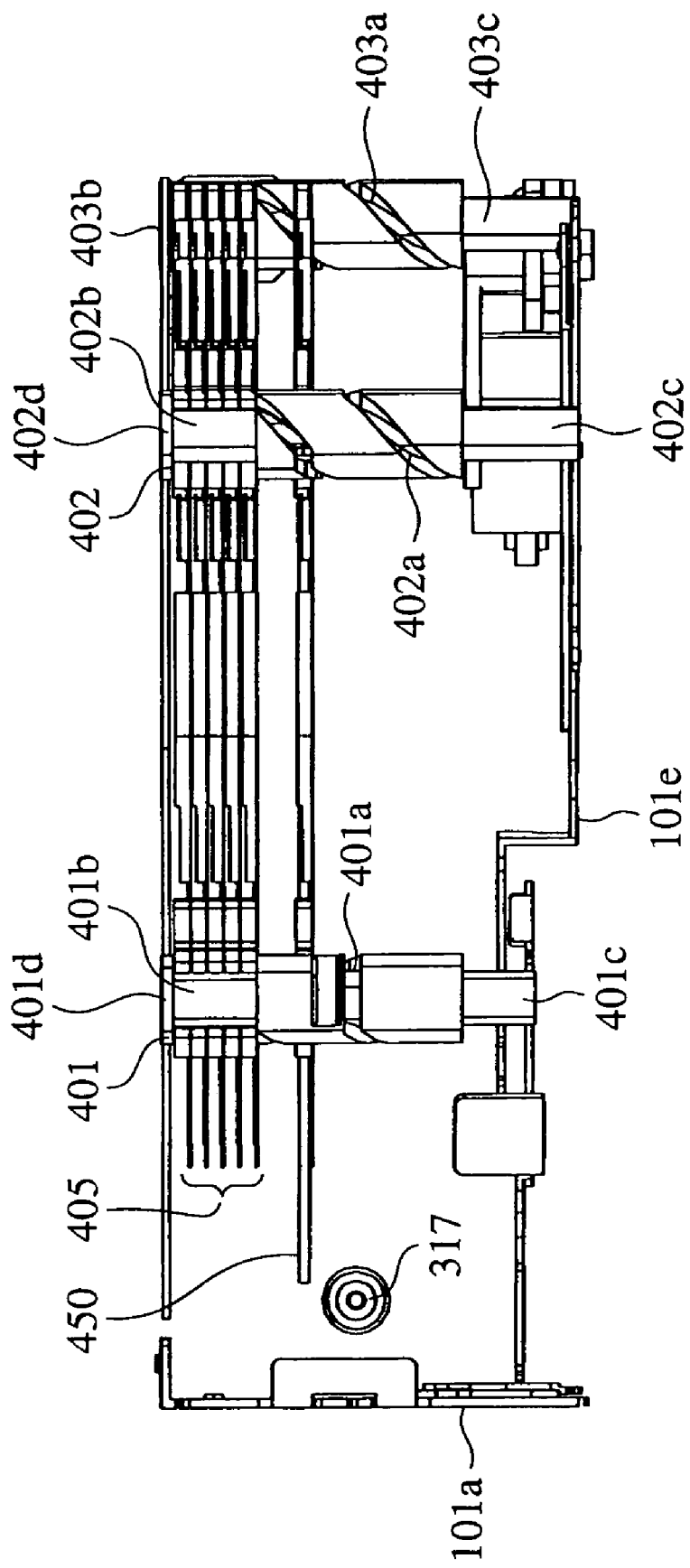
FIG. 22 is a side view showing the right-hand side of the disk apparatus at a time of inserting a disk into a playback unit.

On the other hand, further rotation of the motor 418 rotates the rotation axes 401, 402, and 403 by way of the gear series 419, the large-diameter gear 404, and the gears 401d, 402d, and 403d, and the selected stocker 504 is moved up to the playback unit entry level, as shown in FIG. 22. Simultaneously, the gear 412 is made to rotate and the shaking lever 414 having the pin 414a which is engaged with the 8-shaped cam groove 413a of the gear 413 engaged with the gear 412 is made to rotate in the direction of the arrow H, as shown in FIG. 16. Movement of the sliding plate 415 in the direction of the arrow J, movement of the sliding plate 416 in the direction of the arrow K, and rotation of the rotary plate 417 in the direction of the arrow L, which are caused by the rotation of the shaking lever 414, results in an upward movement of the disk guide member 421 up to the playback unit entry level with the disk guide member 421 holding the disk, as shown in FIG. 21.

The spiral cam groove 203a of the first rotary member 203, which is driven, via the gear series 202, by the motor 201, makes the rotary lever 501 rotate in a direction of an arrow W shown in FIG. 23, and the cut groove 503d of the playback member supporting plate 503 is engaged with the disk center positioning member 103. As a result, as shown in FIG. 23, the axis of the turntable 507 matches with the axis of the disk held by the selected stocker 504.

The above-mentioned rotation of the playback member supporting plate 503 brings the supporting plate 504 arranged on the playback member supporting plate into contact with the disk guide member 421, rotates the rotation axis supporting plate 423 in a direction of an arrow Z of FIG. 24, and retracts the disk guide member 421 from the playback unit entry position. At this time, the clamp plate 508 is placed in a non-chugging state.

Figure 25:
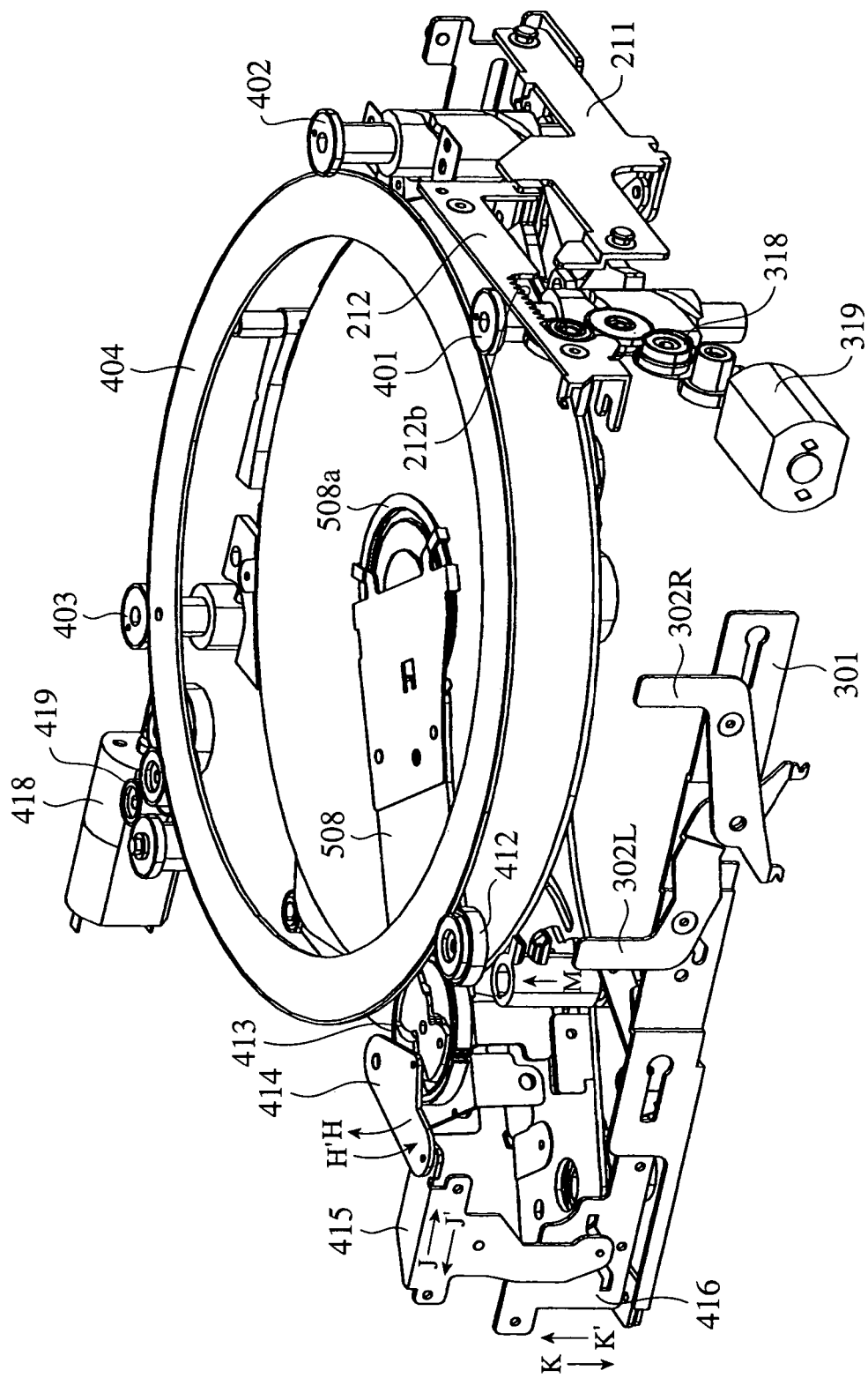
FIG. 25 is a perspective diagram of the disk apparatus when viewed from a right-hand front side thereof.

When the motor 418 further rotates and hence the rotation axes 401, 402, and 403 rotate by way of the gear series 419, the large-diameter gear 404, and the gears 401d, 402d, and 403d, the engaging portion of the selected stocker 504 descends to the disk chugging level (i.e., the disk conveyance level), as shown in FIG. 17. Simultaneously, the rotation of the gear 412 makes the shaking lever 414 having the pin 414a which is engaged with the 8-shaped cam groove 413a of the gear 413 engaged with the gear 412 rotate in a direction of an arrow H', as shown in FIG. 25, and movement of the sliding plate 415 in a direction of an arrow J', movement of the sliding plate 416 in a direction of an arrow K', and rotation of the rotary plate 417 in a direction of an arrow L', which are caused by the rotation of the shaking lever 414, make the disk guide member 421 descend in a direction of an arrow M' to the chugging level and place the disk 450 on the turntable 507, as shown in FIGS. 21 and 25.

Figure 28:
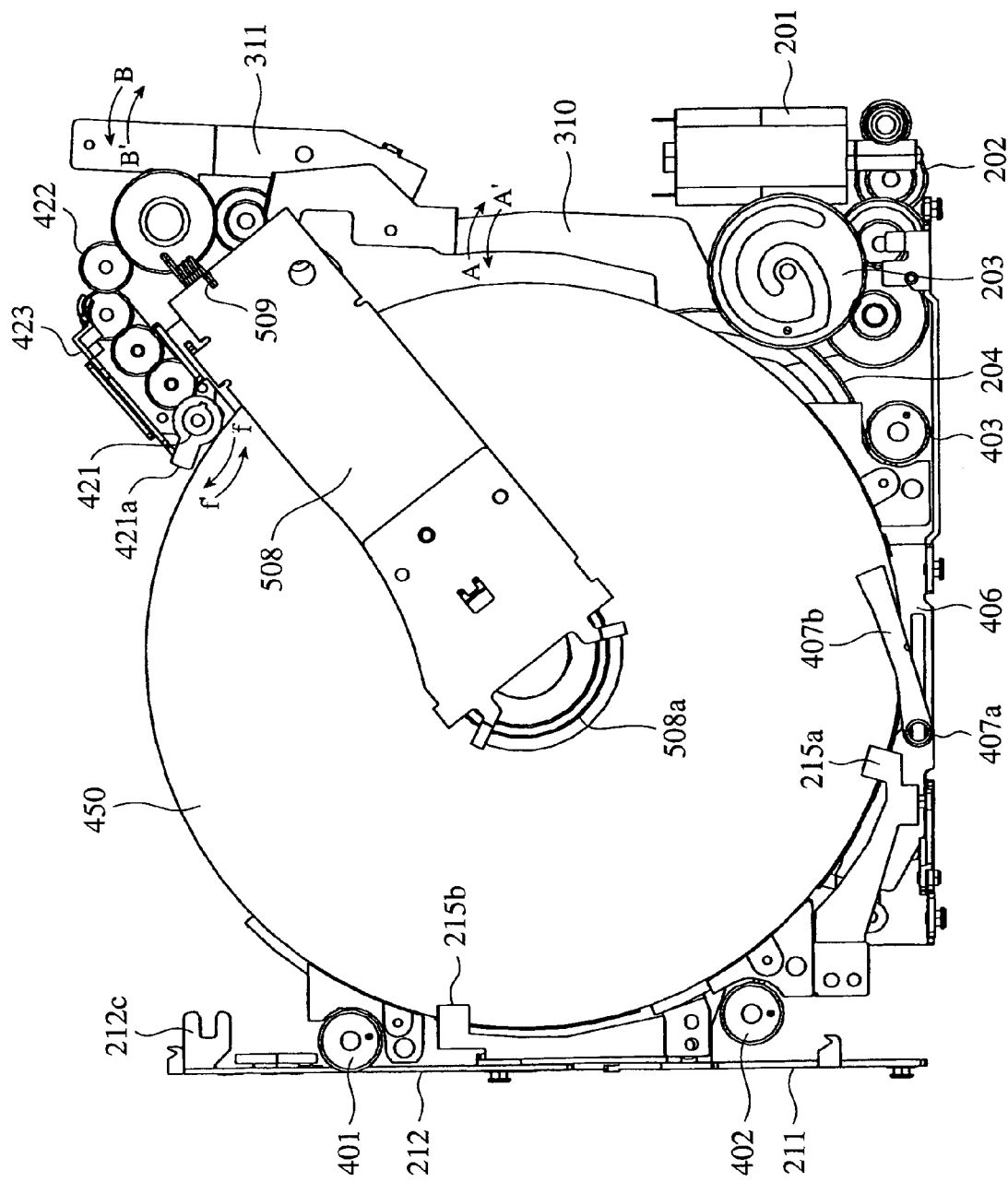
FIG. 28 is a plan view showing the interior of the housing of the disk apparatus in a playback state.

By virtue of the motor 201, the gear series 202, and the cam groove 204d of the second rotary member 204, the lever 510 rotates in a direction of an arrow a, the slide member 511 moves in a direction of an arrow b, the connecting plate 513 rotates in a direction of an arrow c, and the driving plate 515 of the clamp plate 508 moves in a direction of an arrow d, as shown in FIG. 26. As a result, since a rotation preventing member (not shown in the figure) of the clamp plate 508, which is disposed on the driving plate 515, releases prevention of rotation of the clamp plate, the clamp plate 508 descends in a direction of an arrow e because of the spring force of the coil spring 509, as shown in FIG. 26, and the clamper 508a presses the disk toward the turntable 507 so that the disk is placed in the chugging state, as shown in FIG. 28.

Figure 27:
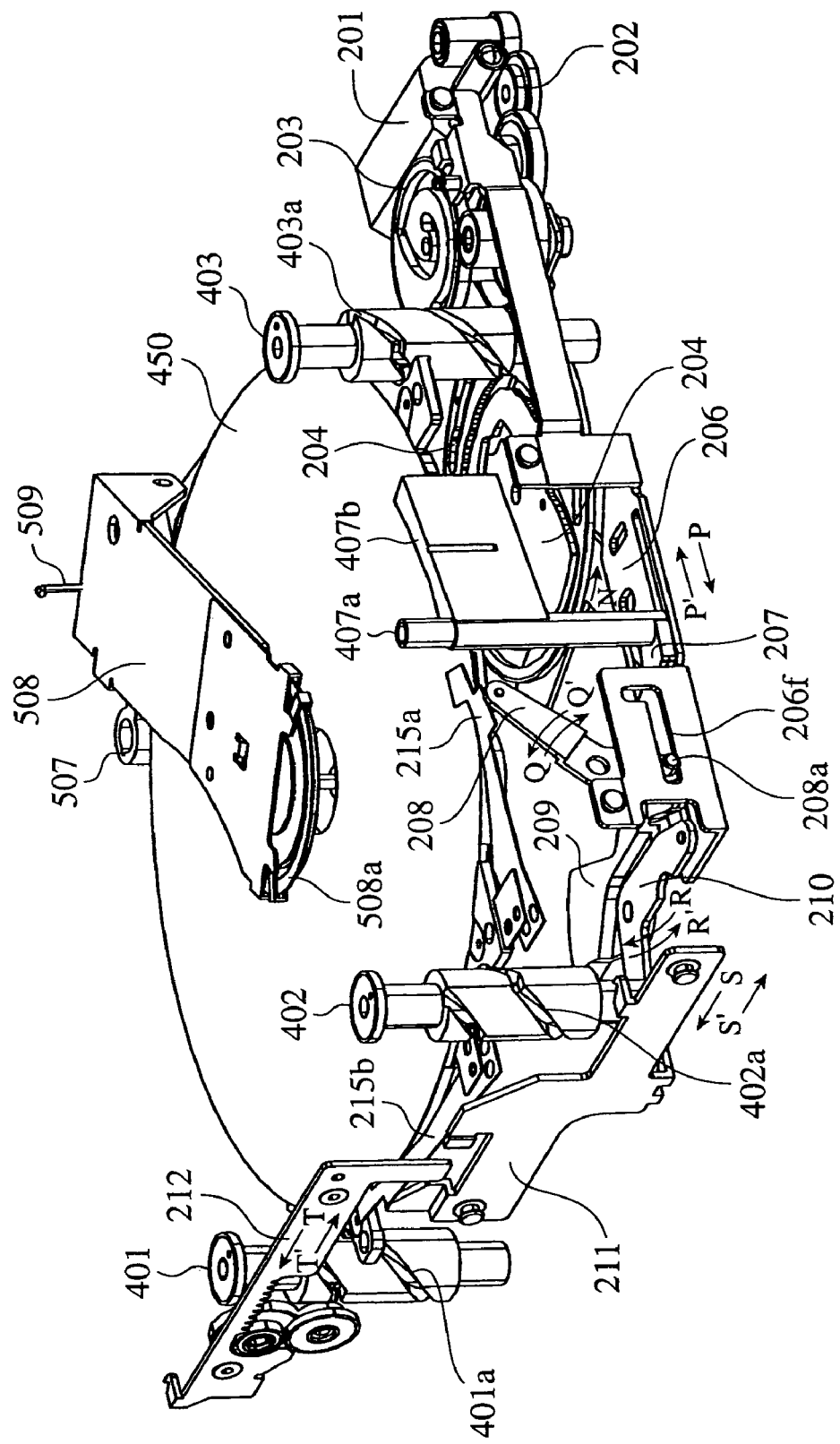
FIG. 27 is a perspective diagram of the disk apparatus when viewed from a right-hand rear side thereof.

Further rotation of the second rotary member 204 caused by further driving of the motor 201 causes movement of the first driving lever 205 in a direction of an arrow N', movement of the sliding plate 206 in a direction of an arrow P', rotation of the lever 208 in a direction of an arrow Q', rotation of the L-shaped lever 210 in a direction of an arrow R', and movement of the sliding plate 211 in a direction of an arrow S', as shown in FIGS. 19 and 20. As a result, end portions of the lever 208 and the sliding plate 211 are brought into contact with the stocker flat springs 215a and 215b, respectively, and the stocker flat springs 215a and 215b are then pushed upward so that they are retracted from the disk, as shown in FIG. 27. Simultaneously, as shown in FIG. 28, the second driving lever 310 is made to rotate in the direction of the arrow A', and the disk guide member 421 is made to rotate in a direction of an arrow f' by way of the gear series 422. As a result, the holding of the disk by the sandwiching member 421a is released.

Figure 29:
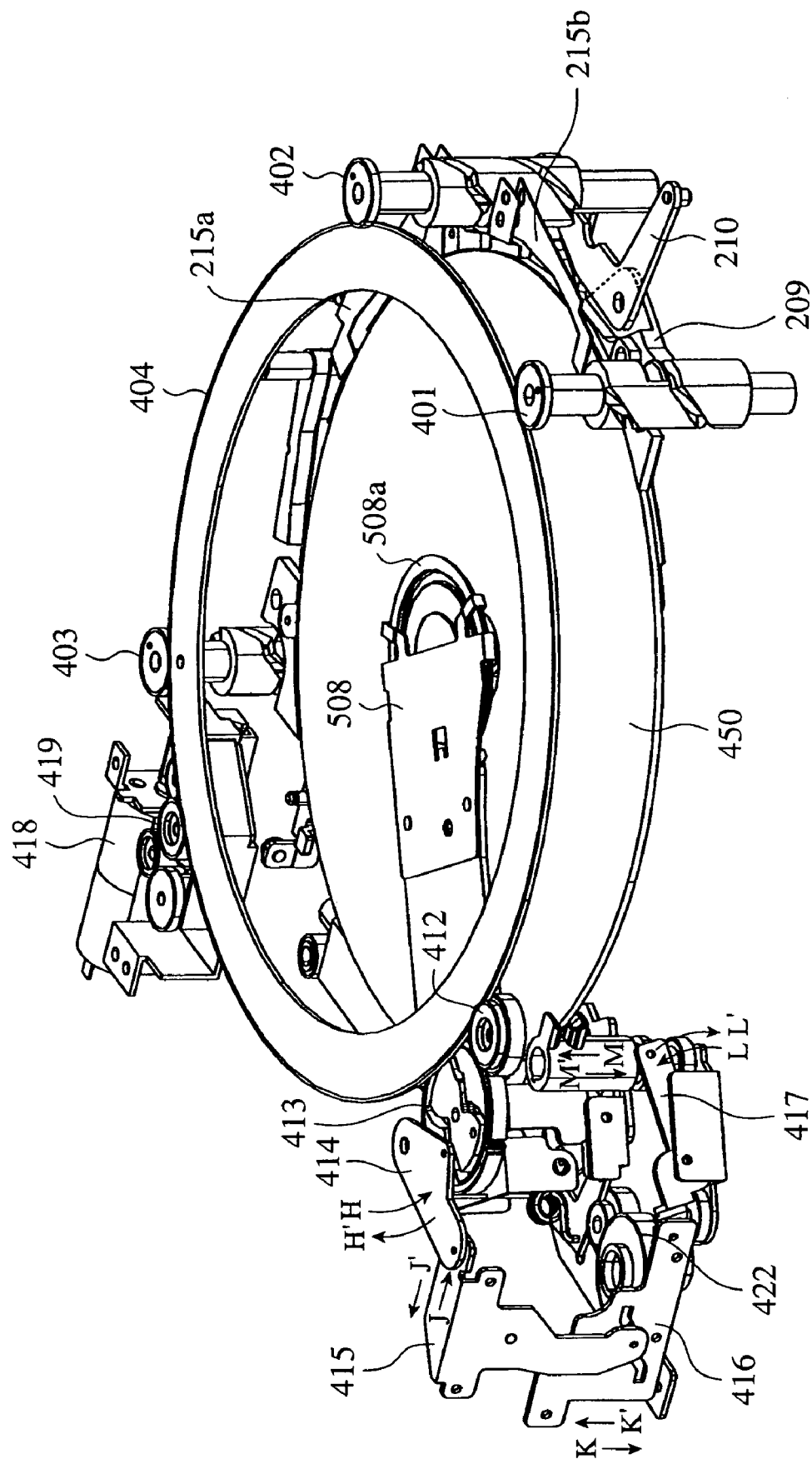
FIG. 29 is a perspective diagram of the disk apparatus when viewed from a right-hand front side thereof.
Figure 30:
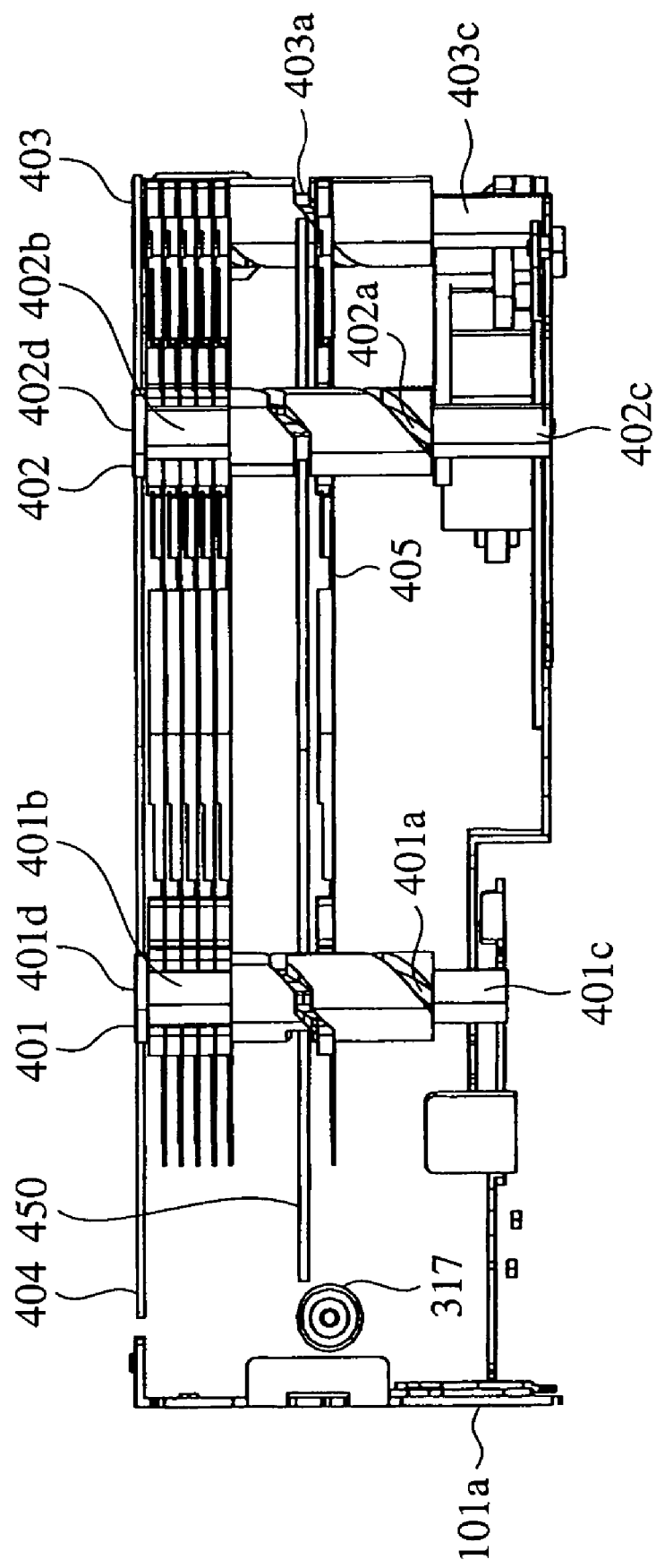
FIG. 30 is a side view showing the right-hand side of the disk apparatus in the playback state.

When the motor 418 further rotates and hence the rotation axes 401, 402, and 403 further rotate because of the driving force of the motor applied thereto by way of the gear series 419, the large-diameter gear 404, and the gears 401d, 402d, and 403d, the selected stocker 504 descends to a playback level, as shown in FIG. 30. Simultaneously, the rotation of the gear 412 makes the shaking lever 414 having the pin 414a which is engaged with the 8-shaped cam groove 413a of the gear 413 engaged with the gear 412 rotate in a direction of an arrow H', as shown in FIG. 25, and movement of the sliding plate 415 in a direction of an arrow J', movement of the sliding plate 416 in a direction of an arrow K', and rotation of the rotary plate 417 in a direction of an arrow L', which are caused by the rotation of the shaking lever 414, make the disk guide member 421 descend in the direction of the arrow M' to the playback unit retraction level, as shown in FIG. 29. As a result, the disk guide member. 421 is retracted from the disk to be played back.

By virtue of the motor 201, the gear series 202, and the cam groove 204d of the second rotary member 204, the lever 510 rotates in the direction of the arrow a, and the slide member 511 moves in the direction of the arrow b, as shown in FIG. 26. As a result, the locking members 505 and 506 are made to rotate in directions of arrows g and h, respectively, as shown in FIG. 31, and the locking of the supporting plate 504 shown in FIG. 24 is then released. The disk apparatus thus advances to the playback operation.

Operations Which Are Performed by the Disk Apparatus Until the Disk is Ejected After Played Back:

The motor 201, the gear series 202, and the cam groove 204d of the second rotary member 204 rotate the lever 510 in a direction of an arrow a', and move the slide member 511 in a direction of an arrow b'. As a result, the locking members 505 and 506 are made to rotate in directions of arrows g' and h', respectively, as shown in FIG. 31, and the supporting plate 504 shown in FIG. 24 is locked.

The driving of the motor 418 causes the rotation axes 401, 402, and 403 to rotate by way of the gear series 419, the large-diameter gear 404, and the gears 401d, 402d, and 403d until the engagement portion of the selected stocker 504 ascends up to the disk chugging level, as shown in FIG. 17. Simultaneously, the gear 412 is made to rotate and the shaking lever 414 having the pin 414a which is engaged with the 8-shaped cam groove 413a of the gear 413 engaged with the gear 412 is also made to rotate in the direction of the arrow H. Movement of the sliding plate 415 in the direction of the arrow J, movement of the sliding plate 416 in the direction of the arrow K, and rotation of the rotary plate 417 in the direction of the arrow L, which are caused by the rotation of the shaking lever 414, results in an upward movement of the disk guide member 421 in the direction of the arrow M to the disk chugging level, as shown in FIG. 29.

Then, further rotation of the second rotary member 204 caused by further driving of the motor 201 rotates the first driving lever 205 in the direction of the-arrow N, and moves the sliding plate 206 in the direction of the arrow P. As a result, the lever 208 rotates in the direction of the arrow Q, the L-shaped lever 210 rotates in the direction of the arrow R, and the sliding plate 211 slides in the direction of the arrow S, and therefore the contact of the end portions of the lever 208 and the sliding plate 211 with the stocker flat springs 215a and 215b is released and the stocker flat springs 215a and 215b are brought into contact with the disk, as shown in FIG. 19. Simultaneously, the second driving lever 310 rotates in the direction of the arrow A', and the disk guide member 421 rotates in the direction of the arrow f by way of the gear series 416, so that the disk is held by the sandwiching portion 421a of the disk guide member 421, as shown in FIG. 28.

In addition, by virtue of the motor 201, the gear series 202, and the cam groove 204d of the second rotary member 204, the lever 510 rotates in the direction of the arrow a, the slide member 511 moves in the direction of the arrow b, the connecting plate 513 rotates in a direction of an arrow c', and the driving plate 515 of the clamp plate 508 moves in a direction of an arrow d', as shown in FIG. 26. As a result, the clamp plate 508 ascends in a direction of an arrow e' against the spring force of the coil spring 509, and the damper 508a is detached from the disk, as shown in FIG. 26.

When the motor 418 further rotates and hence the rotation axes 401, 402, and 403 rotate by way of the gear series 419, the large-diameter gear 404, and the gears 401d, 402d, and 403d, the engaging portion of the selected stocker 504 ascends up to the playback unit entry level, as shown in FIG. 22. Simultaneously, the rotation of the gear 412 makes the shaking lever 414 having the pin 414a which is engaged with the 8-shaped cam groove 413a of the gear 413 engaged with the gear 412 rotate in the direction of the arrow H, and movement of the sliding plate 415 in the direction of the arrow J, movement of the sliding plate 416 in the direction of the arrow K, and rotation of the rotary plate 417 in the direction of the arrow L, which are caused by the rotation of the shaking lever 414, make the disk guide member 421 ascend in the direction of the arrow M to the playback unit entry level and the disk is detached from the turntable 507, as shown in FIG. 25.

By virtue of the motor 201 and the spiral cam groove 203a of the first rotary member 203 which is driven via the gear series 202 by the motor 201, the rotary lever 501 is made to rotate in the direction of the arrow W', as shown in FIGS. 23 and 24, and the playback member supporting plate 503 that supports the whole of the playback unit is made to rotate and retract to a position where the playback member supporting plate 503 is located outside the disk storage area of the disk apparatus. The rotation and retraction of the playback member supporting plate 503 causes the rotation axis supporting plate 423 to rotate in the direction of the arrow Z', and the disk guide member 421 then returns to its initial position.

When the motor 418 further rotates and hence the rotation axes 401, 402, and 403 rotate by way of the gear series 419, the large-diameter gear 404, and the gears 401d, 402d, and 403d, the selected stocker 504 descends to the disk conveyance level, as shown in FIG. 17. Simultaneously, the rotation of the gear 412 makes the shaking lever 414 having the pin 414a which is engaged with the 8-shaped cam groove 413a of the gear 413 engaged with the gear 412 rotate in the direction of the arrow H', and movement of the sliding plate 415 in the direction of the arrow J', movement of the sliding plate 416 in the direction of the arrow K', and rotation of the rotary plate 417 in the direction of the arrow L', which are caused by the rotation of the shaking lever 414, make the disk guide member 421 descend in the direction of the arrow M' to the disk conveyance level, as shown in FIG. 21.

When the motor 319 then rotates, the sliding plate 212 moves in the direction of the arrow T' by way of the gear series 320, and the disk conveying plate 315 moves to the back side of the housing 101 immediately before it is locked by the locking member 322, as shown in FIG. 19. By virtue of this movement of the sliding plate 212, the pin 321 is made to move along the cam groove 101g formed in the right-hand side plate 101b of the housing, the rotary plate 316 is made to rotate in a direction of an arrow l' of FIG. 15, and the gear 318 disposed in the disk conveying roller axis is engaged with the gear series 320.

The rotation of the second rotary member 204 caused by the driving of the motor 201 rotates the first driving lever 205 in the direction of the arrow N', and moves the sliding plate 206 in the direction of the arrow P', rotates the lever 208 in the direction of the arrow Q', rotates the L-shaped lever 210 in the direction of the arrow R', and moves the sliding plate 211 in the direction of the arrow S', as shown in FIG. 19, and therefore the end portions of the lever 208 and the sliding plate 211 are brought into contact with the stocker flat springs 215a and 215b, respectively, and the stocker flat springs 215a and 215b are pushed upward. The contact of the sliding plate 211 with the sliding plate 212 is released.

As a result, the sliding plate 212 moves to its initial position in the direction of the arrow T', and the locking member 322 is made to rotate in the direction of the arrow U' by the forked engaging member 212 and then enters the locking state. Simultaneously, the second driving lever 310 rotates in the direction of the arrow A', and the disk guide member 421 rotates in the direction of the arrow f' by way of the gear series 422, and the holding of the disk by the disk supporting portion 421a of the disk guide member 421 is released, as shown in FIG. 19. Furthermore, the sliding plate 206 moves in the direction of the arrow P', and the restriction on rotation of the disk detection plate 207b is released.

When the motor 418 further rotates and hence the rotation axes 401, 402, and 403 rotate by way of the gear series 419, the large-diameter gear 404, and the gears 401d, 402d, and 403d, the front side of the engaging portion of the selected stocker 504 descends to the playback unit retraction level, as shown in FIG. 13. Simultaneously, the rotation of the gear 412 makes the shaking lever 414 having the pin 414a which is engaged with the 8-shaped cam groove 413a of the gear 413 engaged with the gear 412 rotate in the direction of the arrow H', and movement of the sliding plate 415 in the direction of the arrow J', movement of the sliding plate 416 in the direction of the arrow K', and rotation of the rotary plate 417 in the direction of the arrow L', which are caused by the rotation of the shaking lever 414, make the disk guide member 421 descend in the direction of the arrow M', as shown in FIG. 16. As a result, the disk is made to descend to the playback unit retraction level, as shown in FIG. 17.

The rotation of the second rotary member 204 caused by the driving of the motor 201 rotates the second driving lever 310 in the direction of the arrow A, and also rotates the middle lever 311 in the direction of the arrow B. As a result, the cam plate 301 is moved in the direction of the arrow C, and, as shown in FIG. 11, the shutters 302R and 302L are then apart from the disk conveyance path and the disk insertion/ejection opening 303 is opened.

The motor 319 is then made to rotate and the disk conveying roller 317 is made to rotate by way of the gear series 320. As a result, and the disk is ejected. When the disk is ejected via the disk insertion/ejection opening 303 to a predetermined position, a sensor (not shown) detects this ejection and the motor 319 is stopped, and the disk apparatus enters a state shown in FIG. 14.

Figure 32:
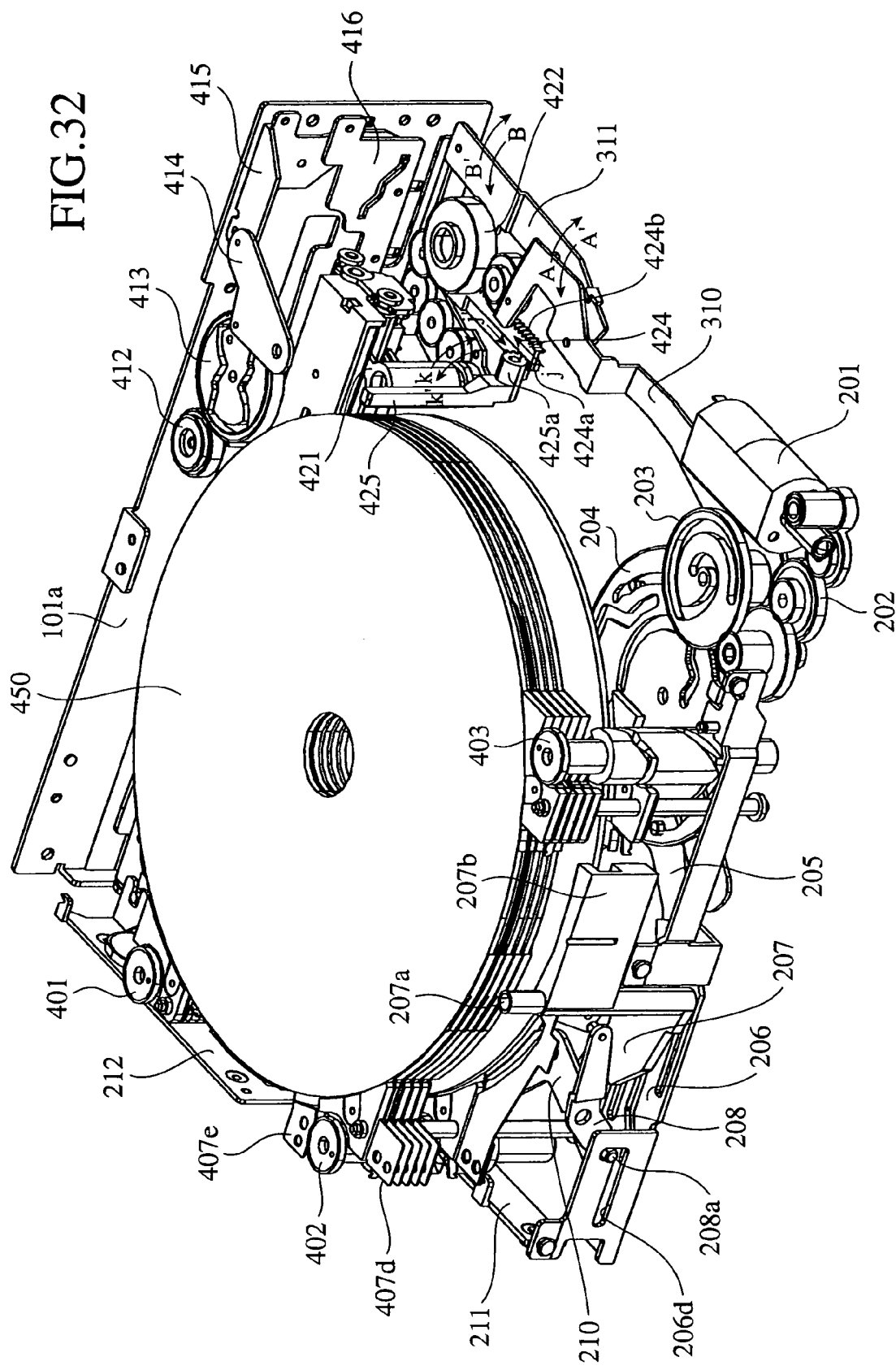
FIG. 32 is a perspective diagram of the disk apparatus when viewed from a left-hand rear side thereof.

Disk Changing Operation:

In the above-mentioned way, the playback unit 500 is made to rotate from the disk playback position to the playback unit retraction position, and the disk guide member 421 is made to return to its initial position. After that, when the second rotary member 204 rotates, the second driving lever 310 rotates in the direction of the arrow A' and the disk guide member 421 rotates in the direction of the arrow f' by way of the gear series 422. As a result, the sandwiching of the disk by the sandwiching portion 421a of the disk guide member 421 is released. Simultaneously, as shown in FIG. 32, a rack member 424 which is engaged with one gear of the gear series 422 moves in a direction of an arrow j, and is then engaged with a gear member 425a of a rotary member 425, and the rotary member 425 then rotates in a direction of an arrow k and stands up because of further movement of the rack member 424. As a result, all disks are prevented from projecting from the plurality of stockers 405 which are in contact with the outer edges of all the disks, as shown in FIG. 32.

When the motor 418 further rotates and hence the rotation axes 401, 402, and 403 rotate by way of the gear series 419, the large-diameter gear 404, and the gears 401d, 402d, and 403d, the selected stocker 504 moves to a desired level.

Figure 33:
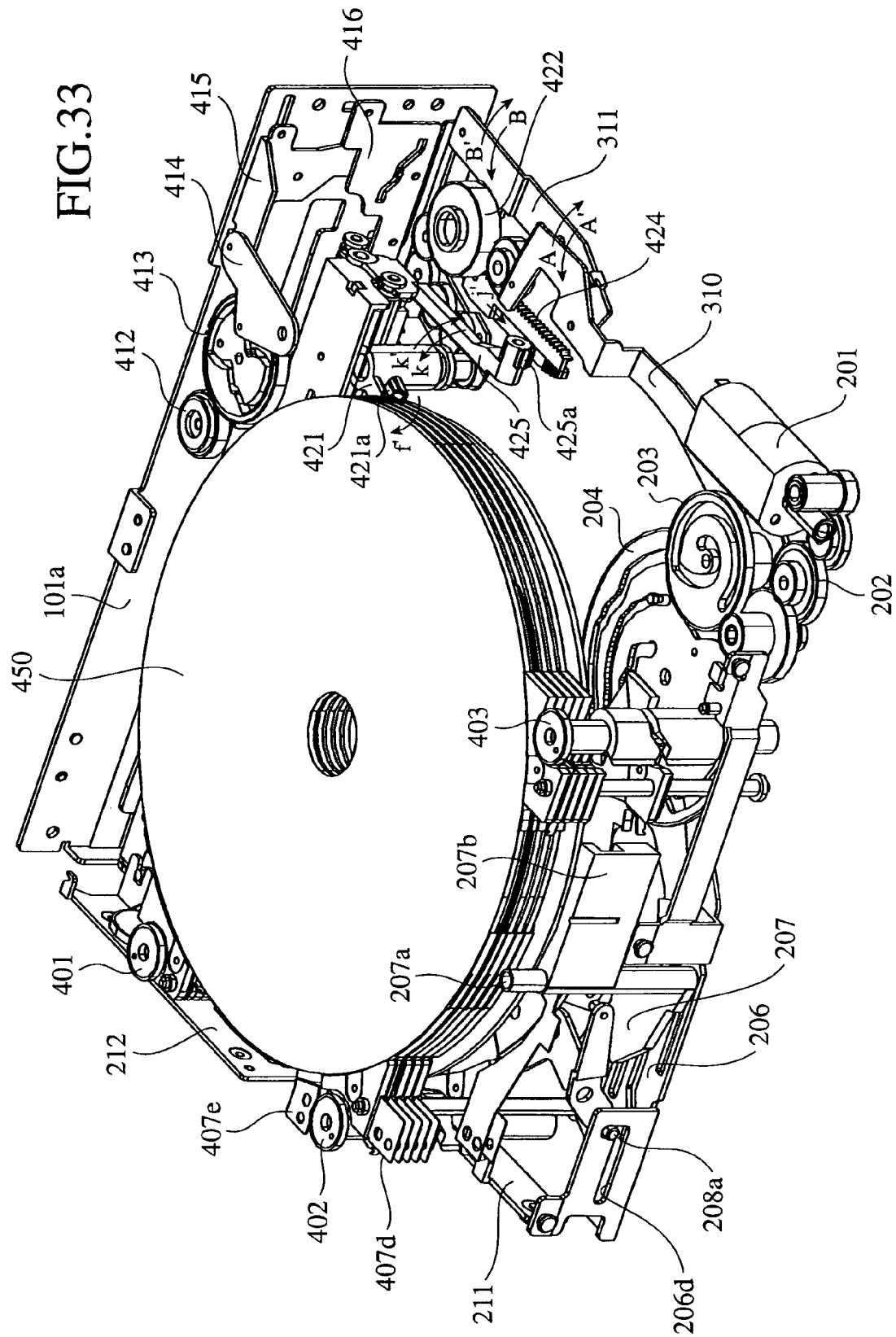
FIG. 33 is a perspective diagram of the disk apparatus when viewed from a left-hand rear side thereof.

The rotation of the second rotary member 204 caused by the driving of the motor 201 rotates the second driving lever 310 in the direction of the arrow A. As a result, the rack member 424 which is engaged with one gear of the gear series 422 moves in a direction of an arrow j', and the rotary member 425 having the gear member 425a which is engaged with the rack member 424 rotates and is retracted in a direction of an arrow k' by virtue of the movement of the rack member. Simultaneously, by virtue of the rotation of the gear series 422, the disk guide member 421 rotates in a direction of an arrow f' and holds the disks, as shown in FIG. 33.

When playing back a selected disk 450, the playback unit 500 is made to rotate to a position where the axis of the turntable 507 matches with the axis of the selected disk in the above-mentioned way, and the selected disk 450 is placed on the turntable 507 and is placed in the chugging state. The stocker flat springs 215a and 215b are then made to be retracted from the disk and the locking of the playback member 502 is released. The disk apparatus thus shifts to the playback operation.

Many widely different embodiments of the present invention may be constructed without departing from the spirit and scope of the present invention. It should be understood that the present invention is not limited to the specific embodiments described in the specification, except as defined in the appended claims.

What is claimed is:

1. A disk apparatus comprising:
   a playback unit having a reading means for reading information recorded on a disk, and a turntable on which said disk is placed, said playback unit being movable between a lateral side of a disk conveyance path and a central portion of said disk;
   an arc-shaped stocker for stocking said disk, said stocker being shaped like a part of a circle whose more than half of its area including a center is removed in order to make it possible for said playback unit to move toward the central portion of said disk; and
   a disk guide member disposed separately from said stocker opposite to a part of said disk which is not held by said stocker, said disk guide member restricting horizontal movements of said disk,
   wherein the disk guide member has a sandwich portion that sandwiches an outer edge of the disk, and can be vertically moved upward or downward with respect to said disk and is retracted to below a disk conveyance path when said disk is conveyed via said disk conveyance path.

2. A disk apparatus comprising:
   a playback unit having a reading means for reading information recorded on a disk, and a turntable on which said disk is placed, said playback unit being movable between a lateral side of a disk conveyance path and a central portion of said disk;

an arc-shaped stocker for stocking said disk, said stocker being shaped like a part of a circle whose more than half of its area including a center is removed in order to make it possible for said playback unit to move toward the central portion of said disk; and a rotatable disk guide member having a sandwiching portion that sandwiches a part of said disk which is not held by said stocker, said rotatable disk guide member restricting a vertical position of said disk wherein said sandwich portion sandwiches an outer edge of the disk, and can be vertically moved upward or downward with respect to said disk and is retracted to below a disk conveyance path when said disk is conveyed via said disk conveyance path.

* * * * *